United States Patent [19]

Maehara et al.

[11] Patent Number: 6,075,715
[45] Date of Patent: Jun. 13, 2000

[54] POWER SOURCE DEVICE

[75] Inventors: Minoru Maehara, Matsubara; Masanori Mishima, Hirakata; Naoki Onishi, Kobe; Yoshinobu Murakami, Hirakata, all of Japan

[73] Assignee: Matsushita Electric Works, Ltd., Osaka, Japan

[21] Appl. No.: 09/042,555

[22] Filed: Mar. 17, 1998

[30] Foreign Application Priority Data

Mar. 26, 1997 [JP] Japan .................................. 9-074137
Apr. 7, 1997 [JP] Japan .................................. 9-088526

[51] Int. Cl.[7] .......................... H02M 5/458; H02M 7/537
[52] U.S. Cl. .............................. 363/37; 363/48; 363/132
[58] Field of Search .................... 363/34, 37, 132, 363/133, 47, 48

[56] References Cited

U.S. PATENT DOCUMENTS

| | | | |
|---|---|---|---|
| 4,564,897 | 1/1986 | Okamoto et al. | 363/132 |
| 5,459,651 | 10/1995 | Maehara | 363/34 |
| 5,737,207 | 4/1998 | Uratani et al. | 363/132 |
| 5,764,496 | 6/1998 | Sato et al. | 363/37 |
| 5,777,861 | 7/1998 | Shimizu et al. | 363/37 |
| 5,875,107 | 2/1999 | Nagai et al. | 363/37 |

FOREIGN PATENT DOCUMENTS

| | | |
|---|---|---|
| 8-98555 | 4/1996 | Japan . |
| 9-191658 | 7/1997 | Japan . |

*Primary Examiner*—Willis R. Wolfe
*Attorney, Agent, or Firm*—Burns, Doane, Swecker & Mathis, L.L.P.

[57] ABSTRACT

A power source device is so constituted that a first capacitor connected across DC output terminals of a rectifier is made to be of a relatively small capacity, a resonance circuit is formed by a primary winding of a transformer and a second capacitor, first and second switching elements connected in parallel to a smoothing capacitor are alternately made ON and OFF to cause currents to flow, a both-end voltage of the first capacitor drops to be substantially close to zero volt even in a period in which a source voltage of an AC power source becomes substantially zero, and an input current can be drawn in smoothly over the entire range of a cycle of the source voltage of the AC power source, whereby higher harmonics of the input current can be reduced, a pulsation of the current flowing to a load can be minimized, and required number of parts for the power source device is reduced to be able to realize circuit simplification and cost reduction.

21 Claims, 26 Drawing Sheets

# POWER SOURCE DEVICE

BACKGROUND OF THE INVENTION

This invention relates to a power source device and, more particularly, to a device for supplying to a load a high frequency voltage converted from a DC voltage obtained by rectifying and smoothing an alternating current.

DESCRIPTION OF RELATED ART

As a conventional power source device of the kind referred to, there has been disclosed in U.S. Pat. No. 4,564,897 to Okamoto et al. a device in which a general half-bridge type inverter circuit is provided for supplying a high frequency power to the load with switching elements alternately turned ON and OFF.

In this known power source device, one of the switching elements in the half-bridge type inverter circuit is provided to be used in common as a switching element of a chopper circuit, so that this switching element will be turned ON and OFF in alternate manner with the other switching element to supply the high frequency power to a load of the inverter circuit and will act also as the switching element of the chopper circuit. That is, as one of the switching elements turns ON, DC output ends of a diode bridge circuit are short-circuited by an inductance. As this switching element turns OFF, next, an energy of the inductance is discharged through a diode to a capacitor, upon which the particular switching element acts also as a chopper switch while the diode acts also as a chopper diode, and the required number of the elements employed can be reduced.

However, the element used in common in the above is just one switching element as well as only one diode, and there still remains in this known device such a drawback that, for the entire circuit, dimensional minimization and cost reduction are not sufficient.

Further, there has been disclosed in Japanese Patent Laid-Open Publication No. 8-98555 by N. Kitamura et al. a power source circuit in a general half-bridge inverter type, in which a series circuit of capacitors is connected across a series circuit of switching elements, and a load circuit is connected between junction points of both series circuits. In this case, the arrangement is so made that one of the capacitors in the series connection is an electrolytic capacitor and the other is a capacitor of a small capacity, and an electrolytic capacitor normally connected across the switching elements is omitted.

This circuit is further provided with a buck converter arrangement, so as to have a chopper function in addition to the half-bridge inverter arrangement, and a trial is made to obtain the optimum input current higher harmonics.

In this circuit, however, there arises a difference in the voltage as applied to the two switching elements forming the series circuit and, in particular, the voltage applied to one of them becomes much higher.

Consequently, a switching element of a high withstand voltage is required in contrast to the power source device of ordinary half-bridge inverter arrangement. Because the different voltages are applied to the two switching elements, further, there has been a problem that the same elements are difficult to be used, and different driving conditions render the driving circuit and heat radiation to be difficult to design.

In Japanese Patent Laid-Open Publication No. 9-191658 of N. Nakagawa et al., further there has been disclosed a circuit employing a half-bridge inverter arrangement in which a series circuit of a capacitor and an inductive load circuit is connected across one of two switching elements in series connection, which elements being alternately made ON and OFF for supplying a high frequency voltage to the load circuit.

In this circuit, further, a series circuit of a rectified power source of an AC source power full-wave rectified and the inductive load circuit is formed and connected across the other switching element so that, upon turning ON of the other switching element, an input current will be caused to flow from the rectified power source through the inductive load circuit to obtain optimum input current higher harmonics, it attempt to skillfully provide to the half-bridge inverter a function of improvement in respect of input current distortion.

With this circuit, however, there has been a problem left unsolved in that a pulsating voltage after being rectified is applied to the inductive load circuit upon turning ON of the switching elements to cause a DC component proportional to the amplitude of the source voltage to be contained.

In the case where the load is a discharge lamp and this lamp is not lighted immediately after starting of circuit operation, further, the inductive load circuit is substantially in its open state, so that there arise such problems that the only existing charging circuit for the capacitor is one passing through the inductive load circuit, thus the capacitor cannot be charged, the circuit cannot be operated, and means for lighting the discharge lamp or for initially charging the capacitor has to be separately provided.

SUMMARY OF THE INVENTION

A primary object of the present invention is to provide a power source device which is capable of overcoming the foregoing problems and realizing a circuit arrangement effective to reduce the higher harmonics in the input current and to minimize the pulsation in the current flowing to the load with a smaller number of required parts.

According to the present invention, the above object can be realized by means of a power source device in which a pair of series-connected switching elements are connected across a smoothing first capacitor connected to means for rectifying an AC source power, first and second diodes are connected in inverse-parallel to the series connected switching elements, an inductance circuit including an inductance element is connected at an end to a junction point of the switching elements, and a load is connected in parallel to the inductance element, characterized in that a second capacitor is connected between the other end of the inductance circuit and at least one end of the first capacitor, and the rectifying means is connected at its output ends between the other end of the inductance circuit and at least the one end of the first capacitor.

Other objects and advantages of the present invention shall become clear as following description of the invention advances as detailed with reference to embodiments shown in accompanying drawings.

While the present invention shall now be described with reference to the respective embodiments shown in the accompanying drawings, it should be appreciated that the intention is not to limit the invention only to these embodiments shown but rather to include all alterations, modifications and equivalent arrangements possible within the scope of appended claims.

DETAILED DESCRIPTION OF THE PREFERRED EMBODIMENTS

Figure 1:
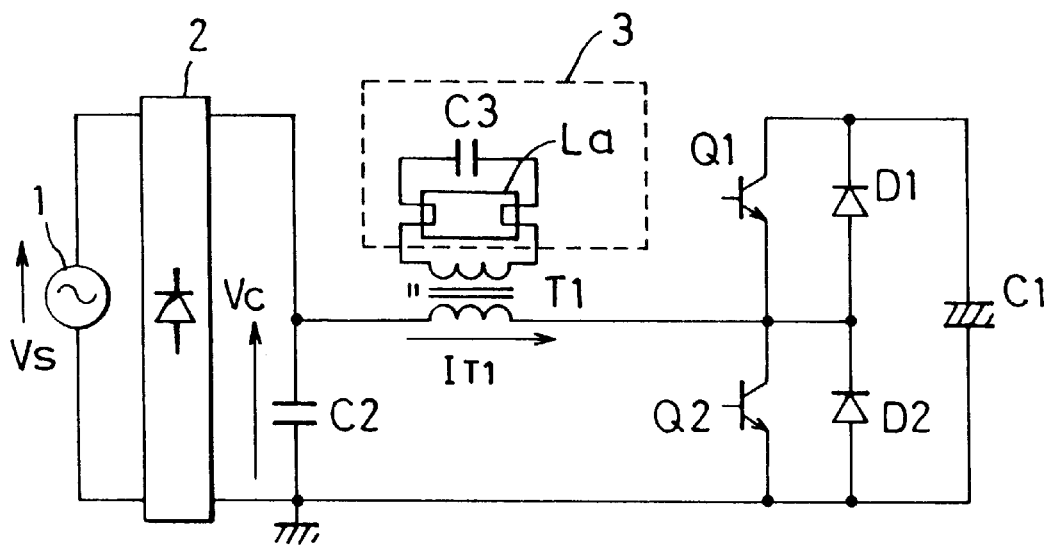
FIG. 1 is a schematic circuit diagram in an embodiment of the power source device according to the present invention.

In the embodiment shown in FIG. 1 of the present invention, the power source device comprises a rectifier 2 of a diode bridge for rectifying an AC source voltage Vs of an Ac power source 1, a smoothing first capacitor, a series circuit of first and second switching elements Q1 and Q2 respectively consisting of a bipolar transistor, the elements Q1 and Q2 being connected in parallel to the first capacitor C1 and alternately made ON and OFF at a high frequency, first and second diodes D1 and D2 connected respectively in inverse-parallel to the first and second switching elements Q1 and Q2, a transformer T1 having a primary winding connected between a junction point of the first and second switching elements Q1 and Q2 and a higher potential side one of DC output terminals of the rectifier 2 and a secondary winding to which a load circuit 3 is connected, and a second capacitor C2 connected at an end to a junction point of the primary winding of the transformer T1 and the higher potential side DC output terminal of the rectifier 2 and at the other end to a lower potential side terminal of the first capacitor C1, wherein the rectifier 2 is connected at a lower potential side DC output terminal to the lower potential side of the capacitor C1. Here, the capacitor C2 connected between the DC output terminals of the rectifier 2 is of a relatively small capacity and forms a resonance circuit in conjunction with the primary winding of the transformer T1.

The load circuit 3 is formed by connecting in series the secondary winding of the transformer T1 and a resonating capacitor C3 to filaments of a discharge lamp La forming the load, and a resonance circuit is formed by a leakage inductance of the transformer T1 and the capacitor C3. The first and second switching elements Q1 and Q2 connected in parallel to the capacitor C1 are provided to be driven by an ordinary driving circuit (not shown) to be alternately turned ON and OFF.

Figure 2:
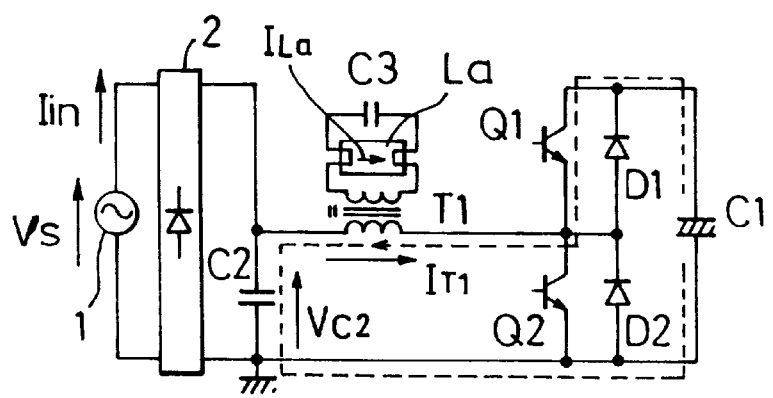
FIGS. 2 through 7 are explanatory views for the operation of the switching elements in the power source device of FIG. 1, respectively.
Figure 3:
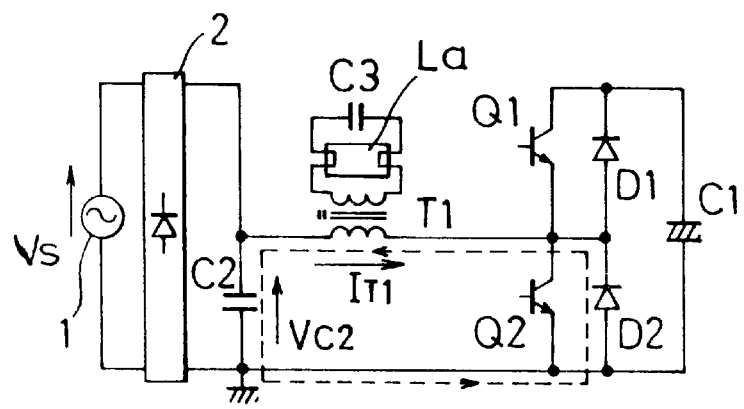
Figure 7:
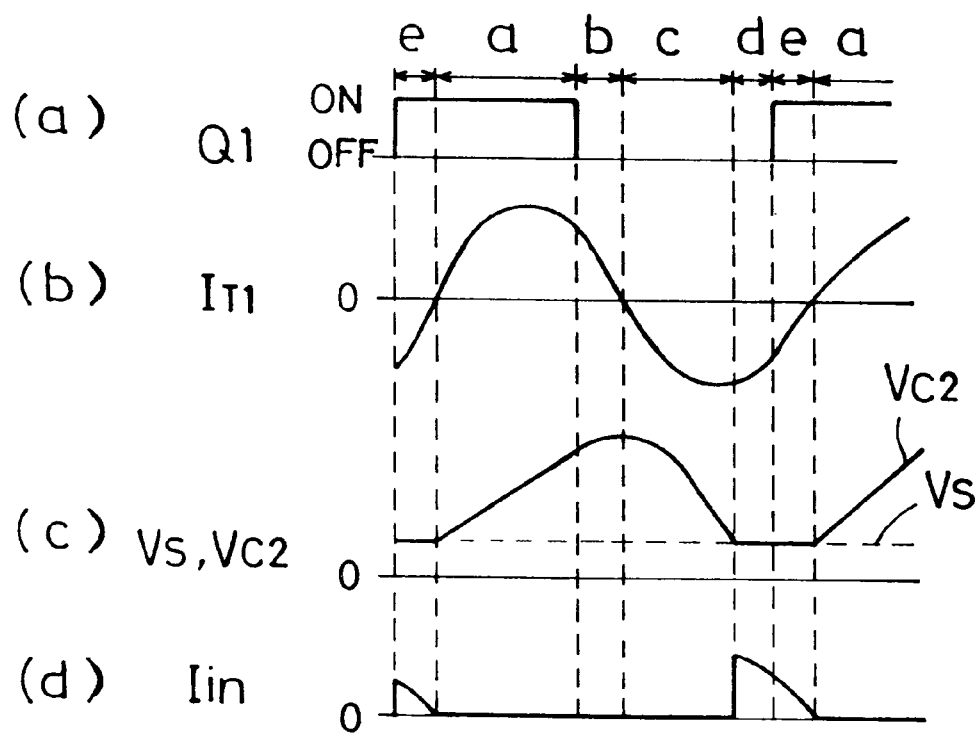

Referring next in detail to the operation of the present embodiment, by starting it with reference to one cycle in which the first and second switching elements Q1 and Q2 are turned ON and OFF, FIG. 2 shows a state of currents flowing through respective parts in an event where the first switching element Q1 is ON and the second switching element Q2 is OFF (a period "a" in FIG. 7), in which a current is caused by a discharge of the capacitor C1 to flow through a path of the capacitor C1→first switching element Q1→primary winding Df the transformer T1→capacitor C2→capacitor C1. At this time, a both-end voltage Vc2 of the capacitor C2 rises due to a resonance with the leakage inductance of the transformer T1 as shown in FIG. 7. On the other hand, as the first switching element Q1 turns OFF, an energy accumulated in the primary winding of the transformer T1 is discharged as shown in FIG. 3, the current keeps flowing through a path of the transformer T1→capacitor C2→second diode D2→transformer T1, and the both-end voltage Vc2 of the capacitor C2 further rises (a period "b" in FIG. 7).

Figure 4:
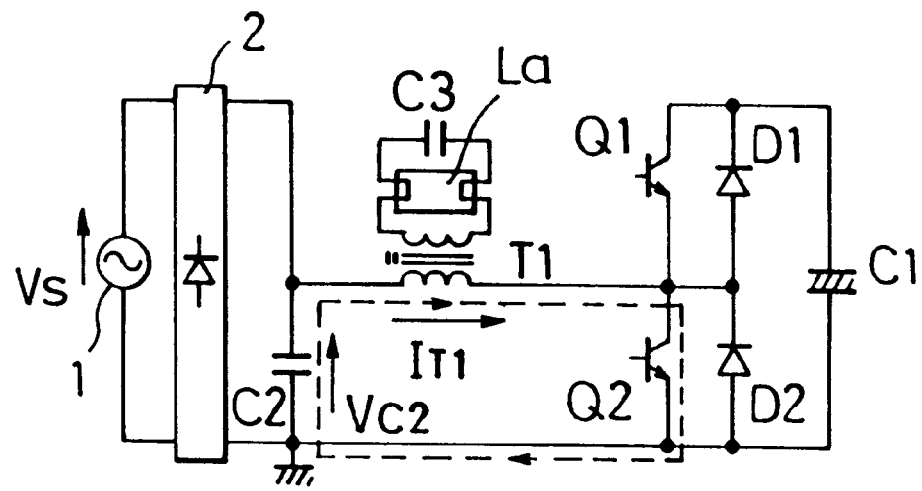
Figure 5:
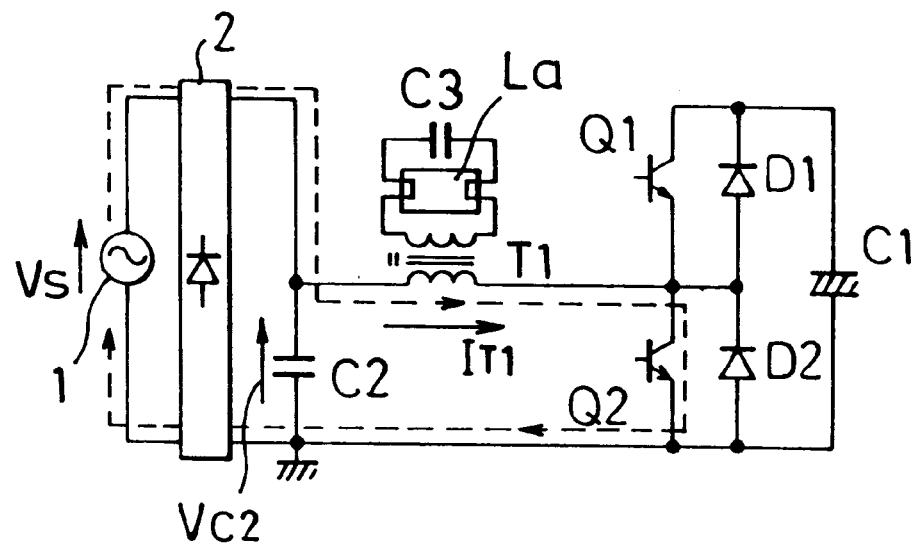
Figure 6:
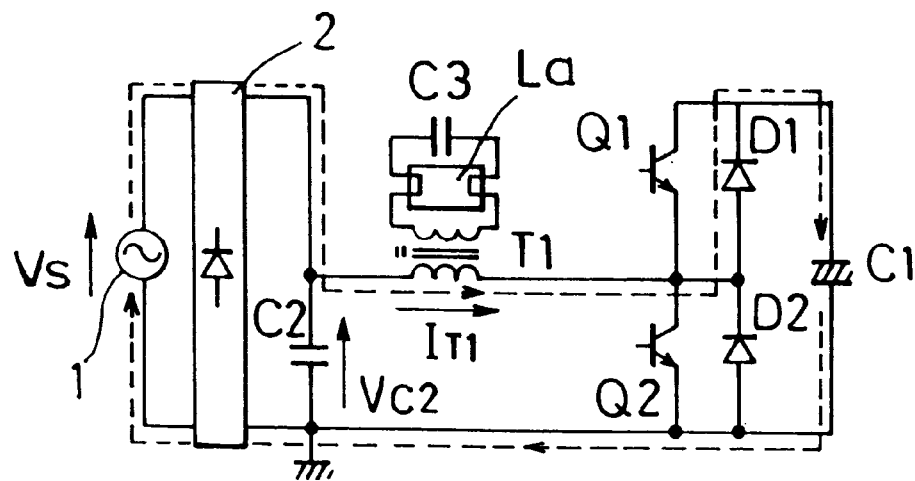

As the second switching element Q2 turns ON following this, a resonance current is caused to flow through a path of the capacitor C2→transformer T1→second switching element Q2→capacitor C2 as shown in FIG. 4 by a resonance action of the leakage inductance of the transformer T1 and capacitors C2 and C3, upon which the both-end voltage Vc2 of the capacitor C2 starts falling (a period "c" in FIG. 7) and, as this both-end voltage Vc2 becomes below a DC output voltage of the rectifier 2, an input current is drawn from the AC power source 1 as shown in FIG. 5, so that a current flows through a path of the AC power source 1→rectifier 2→transformer T1→second switching element Q2→rectifier 2→Ac power source 1 (a period "d" in FIG. 7). Even when the second switching element Q2 turns OFF, this current keeps flowing through a path of the AC power source 1→rectifier 2→transformer T1→first diode D1→capacitor C1→rectifier 2→AC power source 1 (a period "e" in FIG. 7), and the state of FIG. 2 is restored as the current becomes zero.

Figure 8:
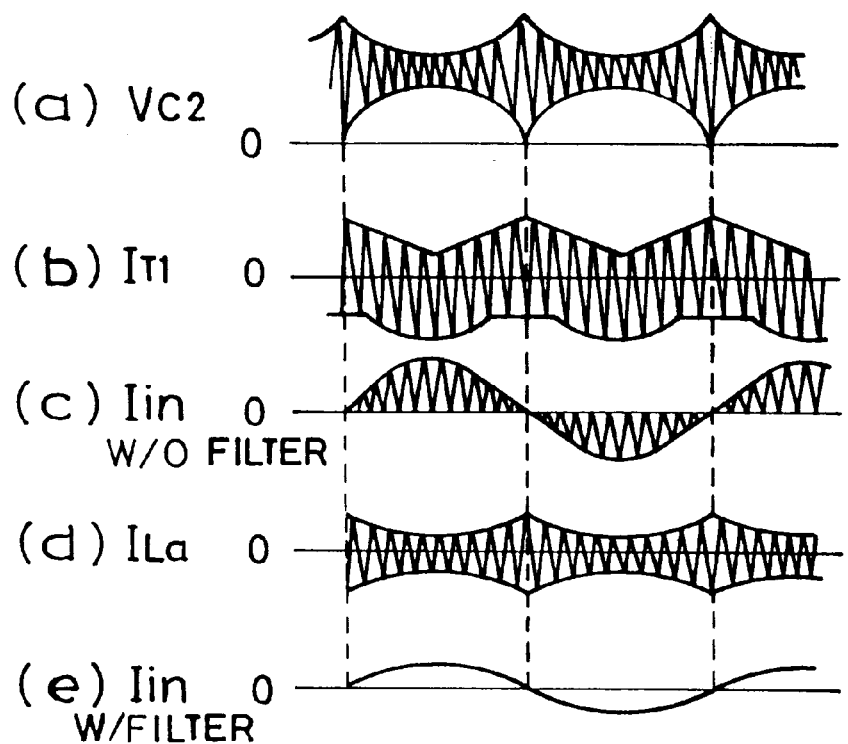
FIGS. 8(a) to 8(e) are explanatory waveform diagrams for the operation of the source voltage in the power source device of FIG. 1.

On the other hand, operational waveforms for one cycle of the source voltage Vs of the AC power source 1 are shown in FIGS. 8(a)–8(e), in which FIG. 8(a) shows the waveform of the both-end voltage Vc2 of the capacitor C2, FIG. 8(b) shows the waveform of the current flowing through the primary winding of the transformer T1, FIG. 8(c) shows the waveform of the input current Iin from the AC power source 1, FIG. 8(d) shows a waveform of a lamp current ILa flowing to the discharge lamp La in the load circuit 3, and FIG. 8(e) shows the input current Iin in the event where a filter circuit is provided at preceding stage of the rectifier 2 for cutting high frequencies. Now, as shown in FIG. 8(b), a DC component is removed by the action of the transformer T1 from the current flowing through the primary winding of the transformer T1, and an AC current of a high frequency is supplied to the discharge lamp La connected to the secondary winding, whereby the discharge lamp La of the load circuit 3 can be lighted by the high frequency AC current. In this case, a filtering by means of such filter circuit as in the above renders the waveform of the input current Iin from the AC source 1 to be of such waveform substantially sinusoidal as shown in FIG. 8(e), and a higher harmonic component of the input current Iin is restrained to be able to improve the input power factor.

Figure 9:
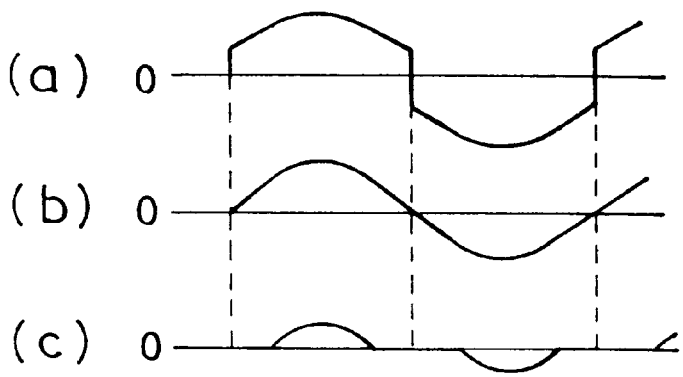
FIGS. 9(a) to 9(c) are waveform diagrams of the input current in the device of FIG. 1.

That is, by setting the capacity of the capacitor C2 at a proper value, it is made possible to draw in the input current Iin over the entire range of the cycle of the source voltage Vs of the AC power source 1 since the both end voltage Vc2 of the capacitor C2 falls to be close to substantially zero even in a period close to substantially zero point of the source voltage Vs of the AC power source. When, for example, the both end voltage Vc2 of the capacitor C2 has a large amplitude, the input current Iin subjected to the filtering will be of such waveform as shown in FIG. 9(a) and, when the voltage Vc2 is of a small amplitude, the input current Iin after the filtering shows such waveform having quiescent time as shown in FIG. 9(c).

Figure 10:
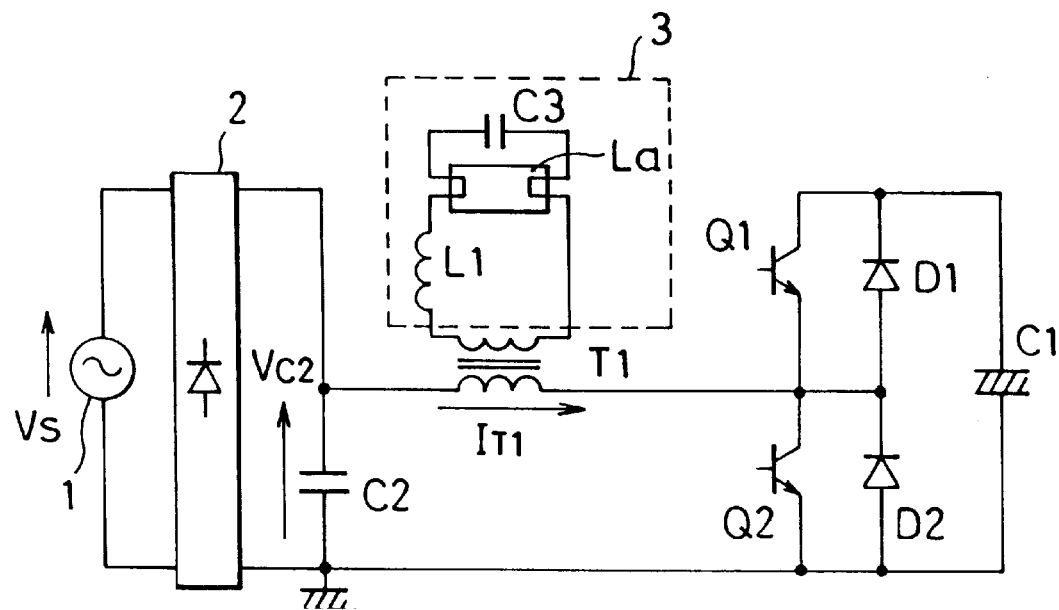
FIG. 10 is a schematic circuit diagram showing another embodiment of the present invention.

According to the present embodiment as in the above, it is possible to constitute a circuit which can restrain the higher harmonic component of the input current and can improve the input power factor, with a relatively smaller number of parts, and the dimensional minimization and cost reduction of the power source device can be realized. While in the present embodiment of FIG. 1 the transformer utilizing the leakage inductance is used as the transformer T1, it is possible to attain the same effect even when a transformer having an ordinary inductor connected in series to the secondary winding (or primary winding) is employed in place of the leakage inductance, as shown in FIG. 10. Here, the operation is common, and its description shall be omitted. Further, when field effect transistors are used as the switching elements, it is enabled to have the part of the first and second diodes D1 and D2 taken by parasitic diodes of the field effect transistors, and the first and second diodes D1 and D2 can be omitted.

While in the present embodiment the discharge lamp La lighted by the high frequency AC current has been referred to as an example of the load, the load should not be limited to the discharge lamp, and the technical idea of the present invention can be easily applied even to a case where the output to the load circuit 3 is a DC output, with the arrangement of the load circuit 3, as will be readily appreciated.

Figure 11:
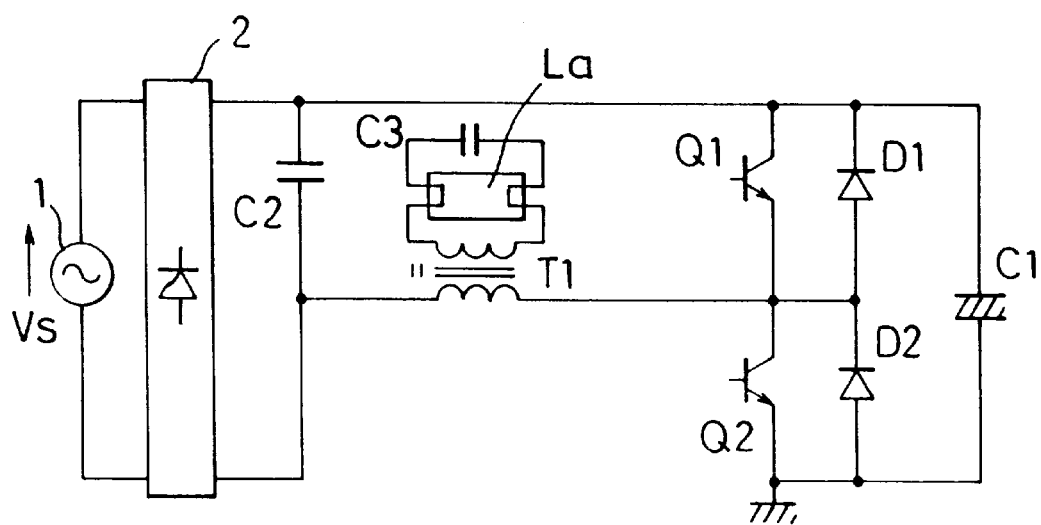
FIGS. 11 and 12 are circuit diagrams showing other embodiments of the present invention.

In FIG. 11, another embodiment of the present invention is shown, in which the primary winding of the transformer T1 and capacitor C2 are connected in series, and in parallel to the first switching element Q1 on higher potential side. Except for this connection, other respects and operation are the same as those in the foregoing embodiment of FIG. 1, and their description shall be omitted.

Here, also in the present embodiment of FIG. 11, it is possible to constitute a circuit which can restrain the higher harmonic component of the input current and can improve the input power factor, with a relatively smaller number of parts, and to realize the dimensional minimization and cost reduction of the power source device can be realized.

Figure 12:
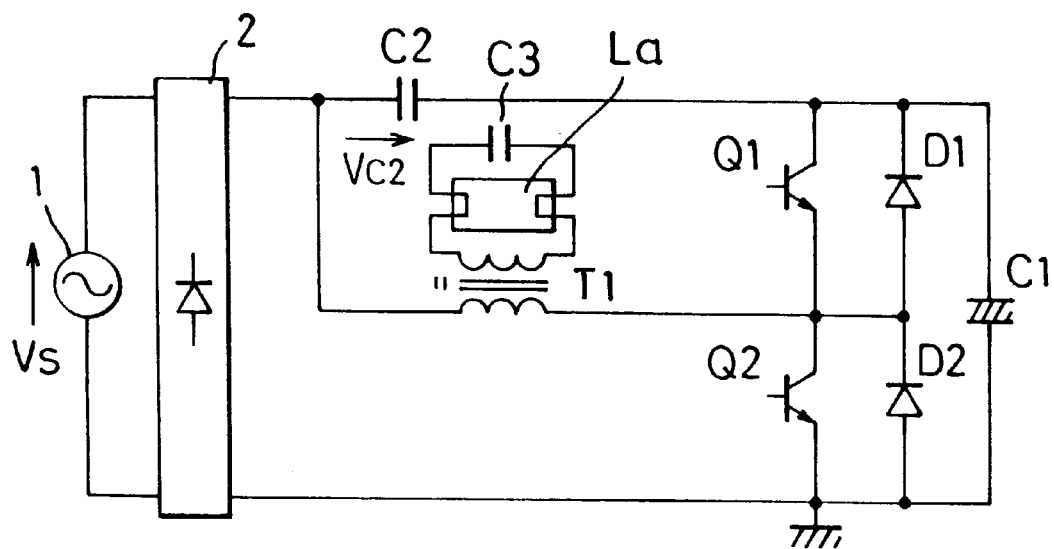

In FIG. 12, another embodiment of the present invention is shown, in which the capacitor C2 of small capacity is inserted, in contrast to the arrangement in the embodiment of FIG. 1, between the higher potential side output terminal of the rectifier 2 and the higher potential side terminal of the capacitor C1. In the present instance, the capacitors C1 and C2 are connected in series, between both output terminals of the rectifier 2. Since the capacity of the capacitor C2 is sufficiently smaller than the capacity of the capacitor C1, it can be regarded that equivalently the capacitor C2 is connected across the output terminals of the rectifier 2.

When the first switching element Q1 is ON in this power source circuit, first, a current flows through a path of the capacitor C2→first switching element Q1→transformer T1→capacitor C2. At this time, the both-end voltage Vc2 of the capacitor C2 resonates with the leakage inductance of the transformer T1 similarly to the case of the embodiment of FIG. 1. Different from the embodiment of FIG. 1 is that, provided that the direction of the both-end voltage Vc2 in the drawing is positive, then the voltage is to be decreased. In this case, the first switching element Q1 turned OFF causes a current to keep flowing through a path of the transformer T1→capacitor C2→capacitor C1→diode D2→transformer T1, and the capacitor C2 discharges its charge, so that the both-end voltage Vc2 will be further decreased.

Next, as the second switching element Q2 turns ON, a resonance between the leakage inductance of the transformer T1 and the capacitors C2 and C3 causes a resonance current to flow through a path of the capacitor C2→transformer T1→second switching element Q2→capacitor C1→capacitor C2. At this time, the both-end voltage Vc2 starts rising and, as the sum of the both-end voltage Vc2 and the source voltage Vs of the AC source 1 exceeds a voltage of the capacitor C1, a current flows through a path of the AC power source 1→rectifier 2→transformer T1→second switching element Q2→rectifier 2→AC power source 1, and the input current Iin is drawn in from the AC power source 1. Further, as the second switching element Q2 turns OFF, the current keeps flowing through a path of the AC power source 1→rectifier 2→transformer T1→diode D1→capacitor C1→rectifier 2→AC power source 1, and, as the current becomes zero, the first switching element Q1 returns to the original ON state. In the present instance, too, it is possible to constitute a circuit capable of restricting the higher harmonic component of the input current, and to improve the input power factor, with the relatively smaller number of parts in similar manner to the embodiment of FIG. 1, and the dimensional minimization and cost reduction of the power source device can be realized.

Figure 13:
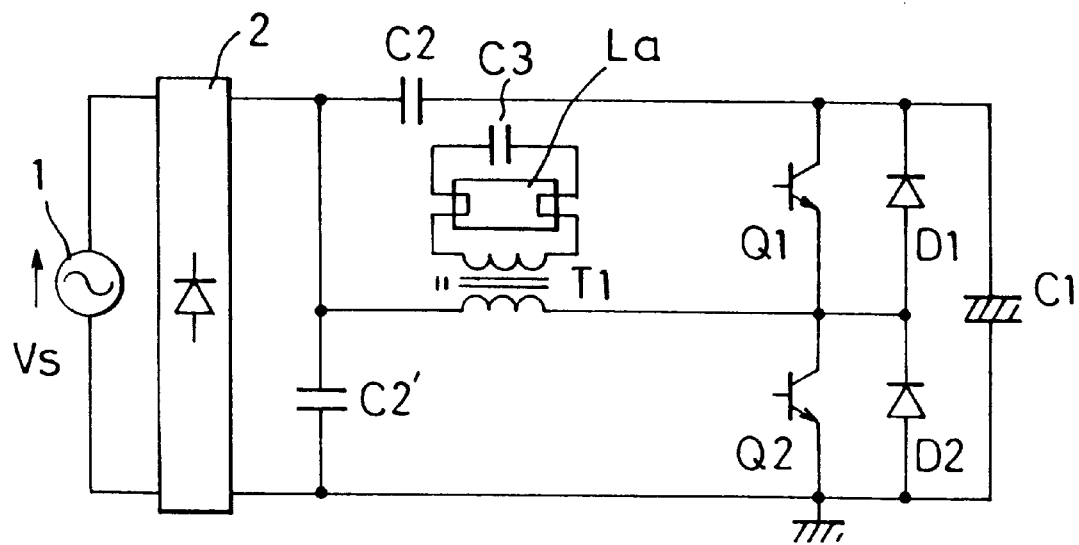
FIG. 13 is a schematic circuit diagram showing another embodiment capable of employing the embodiment of FIG. 12.

Further, as shown in FIG. 13, it may be also possible to connect a further capacitor C2' between both output terminals of the rectifier 2 as shown in FIG. 13, so as to cause the capacitors C2 and C2' to act the part of the second capacitor. As the arrangement and operation are the same as the embodiment of FIG. 1 as in the above, their description shall be omitted here.

Figure 14:
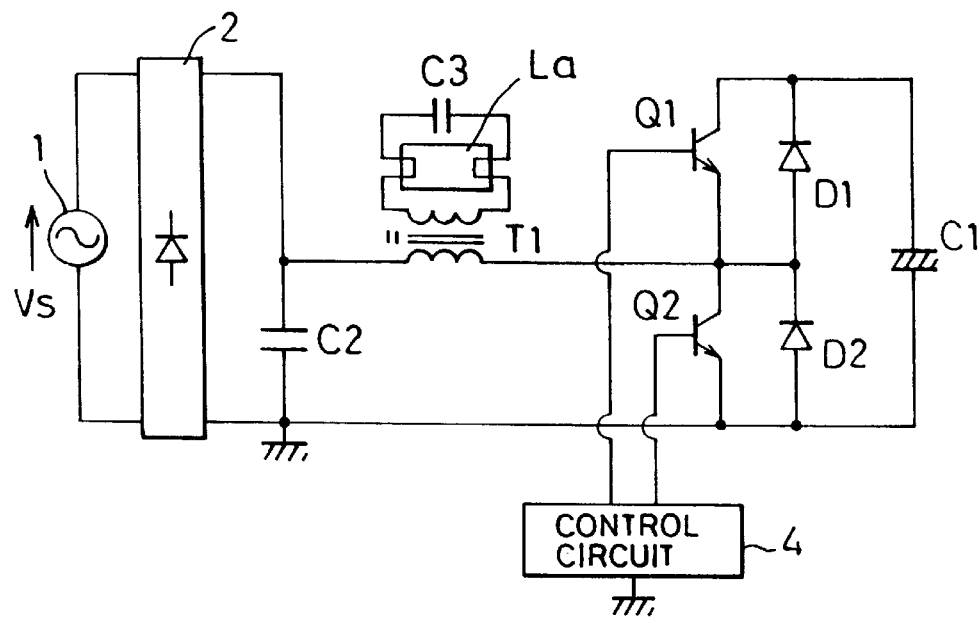
FIGS. 14 to 16 are schematic circuit diagrams respectively showing other embodiments of the present invention.

In another embodiment of the present invention shown in FIG. 14, the device is provided with a control circuit 4 which is capable of rendering a driving frequency, ON time, duty ratio or the like of the first and second switching elements Q1 and Q2 to be variable, with respect to the arrangement of the embodiment of FIG. 1.

When the ON time of the second switching element Q2 is controlled to be shortened, for example, by the control circuit 4, it is possible to reduce the input current Iin drawn in from the AC power source 1, whereby it is made possible to restrain any abnormal voltage rise in a DC voltage (both-end voltage Vc1 of the capacitor C1) by relatively shortening the ON time of the second switching element Q2, when consuming power of the discharge lamp La as the load is small such as during a preheating or starting. Even during the lighting of the discharge lamp La, further, the power supplied to such load as the discharge lamp La can be made variable by varying the driving frequency or duty ratio, or both of the driving frequency and duty ratio of the first and second switching elements Q1 and Q2, and a dimming of the discharge lamp La is made possible. Further, even in the case where the discharge lamp La is dimmed by varying thus the supplied power, it is possible to restrain the abnormal voltage rise of the DC voltage (the both-end voltage Vc1 of the capacitor C1), by adjusting the ON time of the second switching element Q2.

According to the present embodiment as has been described, it is possible to execute the preheating, starting and lighting control of such load as the discharge lamp La, and also to perform the adjustment of the supplied power to the load, that is, the dimming of the discharge lamp La, and, further, it is possible to prevent the switching elements and so on from being damaged by the abnormal voltage rise in the DC voltage (the both-end voltage Vc1 of the capacitor C1) due to fluctuation in the consuming power. Further, it should be appreciated that the arrangement of the present embodiment is applicable not only to the embodiment of FIG. 1 but also to the embodiment of FIG. 11, 12 or 14.

Figure 15:
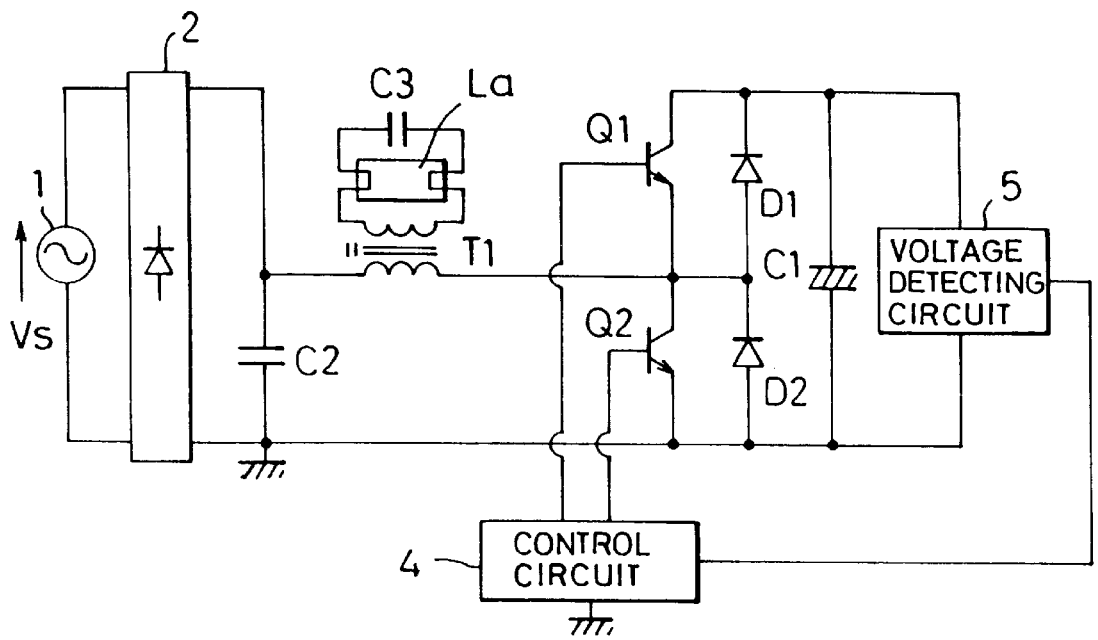

In another embodiment of the present invention as shown in FIG. 15, there is provided a voltage detecting circuit 5 for detecting the DC voltage (the both-end voltage) occurring at both ends of the capacitor C1 with respect to the arrangement of the embodiment of FIG. 14, and the arrangement is so made that a control for rendering the driving frequency, ON time or duty ratio of the first and second switching elements Q1 and Q2 to be variable, or a control for stopping an oscillation of the first and second switching elements Q1 and Q2 is carried out at the control circuit 4 in accordance with the value of the both-end voltage Vc1 detected at the voltage detecting circuit 5.

Here, the both-end voltage Vc1 of the capacitor C1 can be maintained substantially at a constant, predetermined value, by varying the driving frequency, ON time or duty ratio with the control circuit 4 so that, for example, the voltage value detected it the voltage detecting circuit 5 will be at a predetermined value. As a result, a stable output can be obtained and, in the event where the load is the discharge lamp, any flickering in light output can be reduced.

Further, in an event when the voltage detected at the voltage detecting circuit 5 has become abnormally high, any damage of the switching elements and so on due to such overvoltage can be avoided by so arranging that the oscillation of the first and second switching elements Q1 and Q2 is stopped by the control circuit 4.

As will be readily appreciated, further, the arrangement of the present embodiment is applicable not only to the embodiment of FIG. 1 but also to the embodiment of FIG. 11, 12 or 14.

Figure 16:
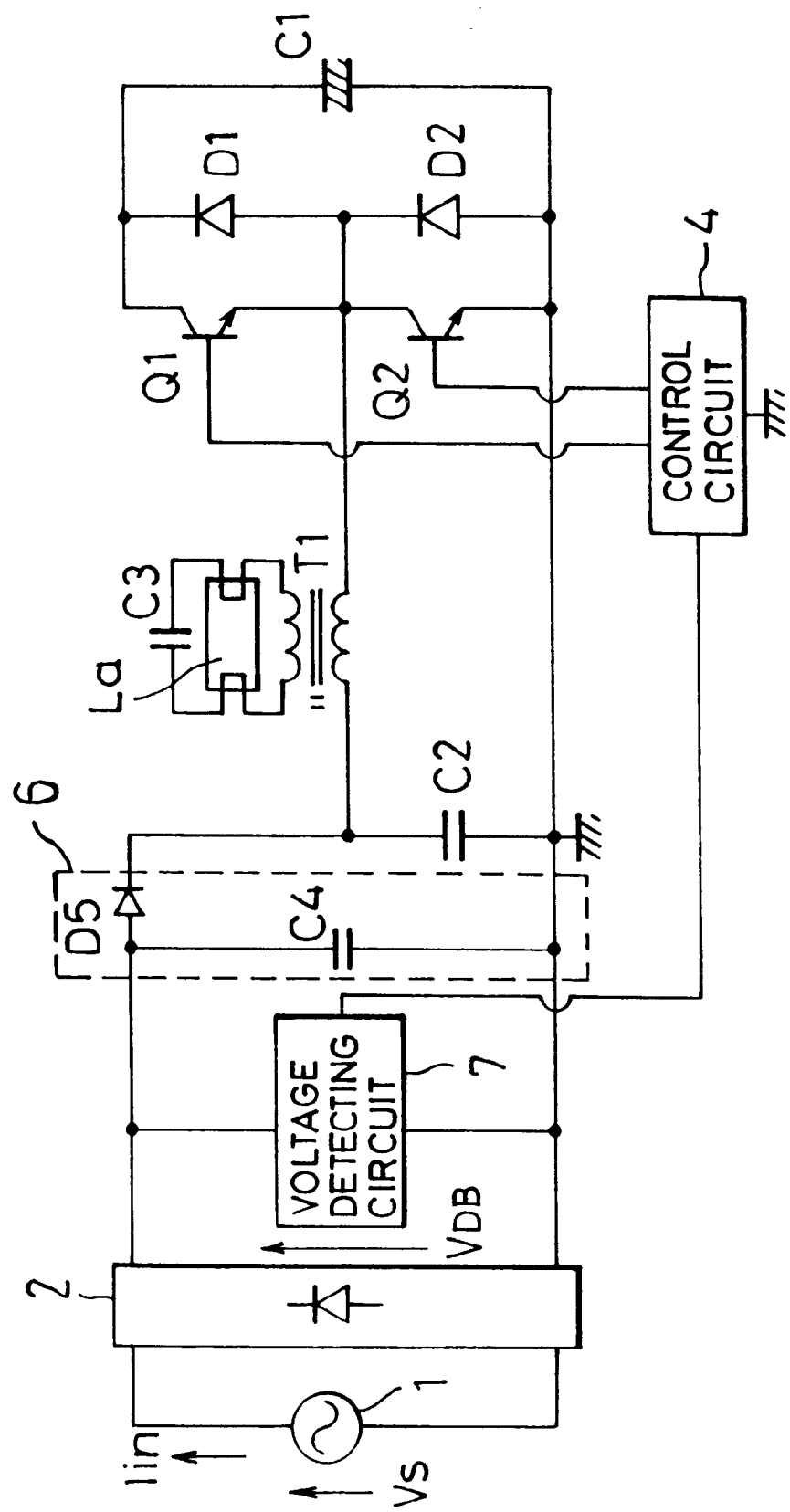

In another embodiment of the present invention shown in FIG. 16, the arrangement is featured in that the embodiment of FIG. 1 further comprises a rectifying, smoothing circuit 6 comprising a capacitor C4 connected across the output terminals of the rectifier 2 and a diode D5, a voltage detecting circuit 7 for detecting a pulsating voltage VDB produced across the output terminals of the rectifier 2, and the control circuit 4 capable of varying the driving frequency, ON time or duty ratio of the first and second switching elements Q1 and Q2 in response to the voltage VDB detected at the voltage detecting circuit 7.

Figure 17:
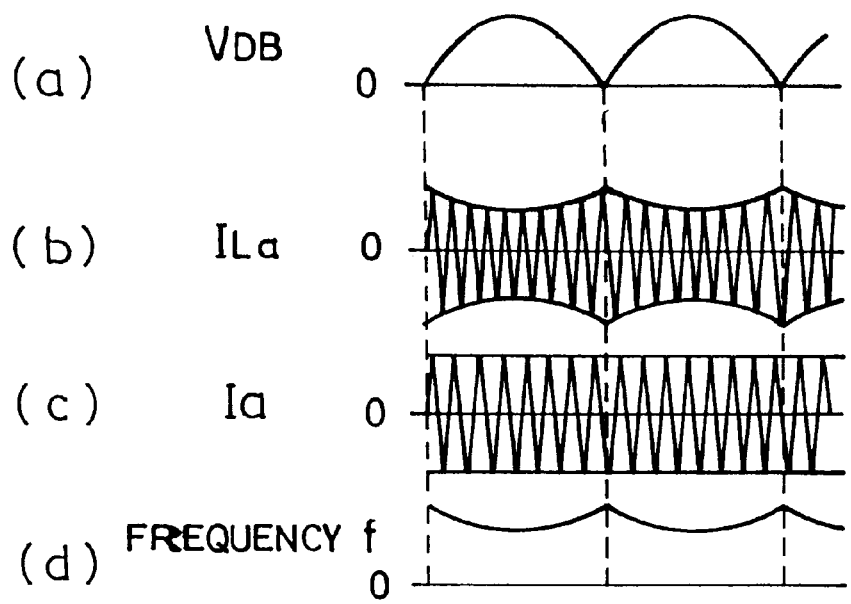
FIGS. 17(a)–17(d) and 18(a)–18(d) are explanatory waveform diagrams for the operation of the embodiment of FIG. 16.

In the present embodiment, as shown for example in FIG. 17, the driving frequency f of the first and second switching elements Q1 and Q2 is elevated by means of the control circuit 4 at valley portions of the pulsating voltage VDB, whereby the lamp current ILa flowing to the discharge lamp La is made small in the amplitude, and the driving frequency f of the first and second switching elements Q1 and Q2 is lowered by means of the control circuit 4 at mountain portions of the pulsating voltage VDB to thereby render the amplitude of the lamp current ILa to be enlarged, whereby any ripple occurring in the lamp current ILa can be reduced at a power source cycle of the AC source 1 (for example, commercial source cycle), and the crest factor of the lamp current ILa can be improved.

Figure 18:
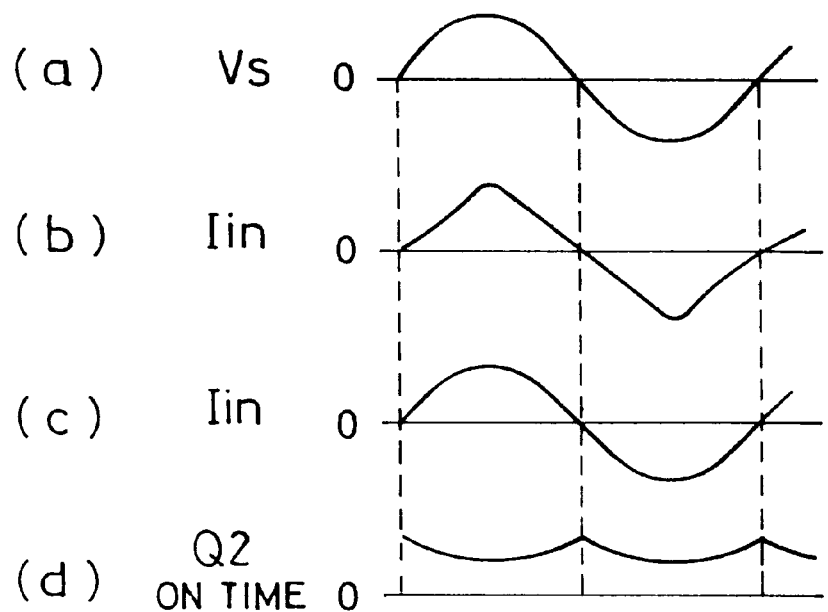

Further, as shown in FIG. 18, it is made possible to render the waveform of the Input current Iin filtered through an optimum filter circuit (not shown) to be closer to a sinusoidal wave for restraining the higher harmonic component of the input current Iin and elevating the input power factor, by elongating the ON time of the second switching element Q2 with the control circuit 4 at the valley portions of the pulsating voltage VDB so as to draw in much more of the input current Iin from the AC power source 1, and by shortening the ON time of the second switching element Q2 with the control circuit 4 at the mountain portions of the pulsating voltage VDB so as to reduce the input current Iin drawn in from the AC power source 1.

It should be also appreciated that the arrangement of the present embodiment is applicable not only to the embodiment of FIG. 1 but also to the embodiment of FIG. 11, 12 or 14.

Figure 19:
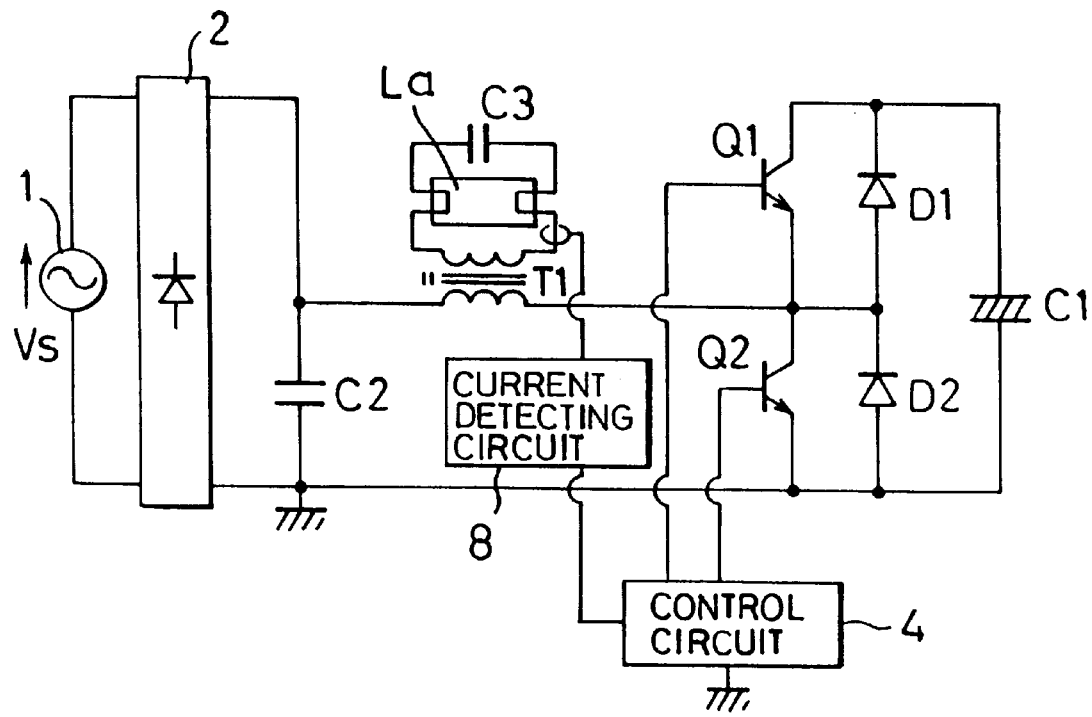
FIGS. 19 to 24 are schematic circuit diagrams showing respective other embodiments of the present invention.

In another embodiment of the present invention as shown in FIG. 19, the device is featured in that, with respect to the embodiment of FIG. 14, a current detecting circuit 8 is provided for detecting the lamp current or the current flowing through the load circuit 3, so that a control for rendering the driving frequency, ON time or duty ratio of the first and second switching elements Q1 and Q2 to be variable in accordance with he current value detected by this current detecting circuit 8 will be performed at the control circuit 4.

When the lamp current detected by the current detecting circuit 8 is large, for example, the control circuit 4 elevates the driving frequency of the first and second switching elements Q1 and Q2 or unbalances the duty ratio so as to reduce the amplitude of the lamp current, whereas, when the lamp current detected by the current detecting circuit 8 is small, the control circuit 4 lowers the driving frequency of the first and second switching elements Q1 and Q2 or renders the duty ratio closer to 50% so as to enlarge the amplitude of the lamp current, so that it is enabled to reduce the ripple occurring in the lamp current ILa at the source cycle (for example, the commercial source power cycle), and to improve the crest factor of the lamp current ILa.

It will be also possible to maintain the lamp current at a predetermined value to restrain any fluctuation in the lamp power even upon occurrence of the fluctuation in the source voltage Vs of the AC power source 1, for example, by means of the control circuit 4 which performs a feedback control so that the lamp current detected at the current detecting circuit 8 will be substantially constant.

The arrangement of the present Embodiment should be applicable not only to the embodiment of FIG. 1 but also to the embodiment of FIG. 11, 12 or 14.

Figure 20:
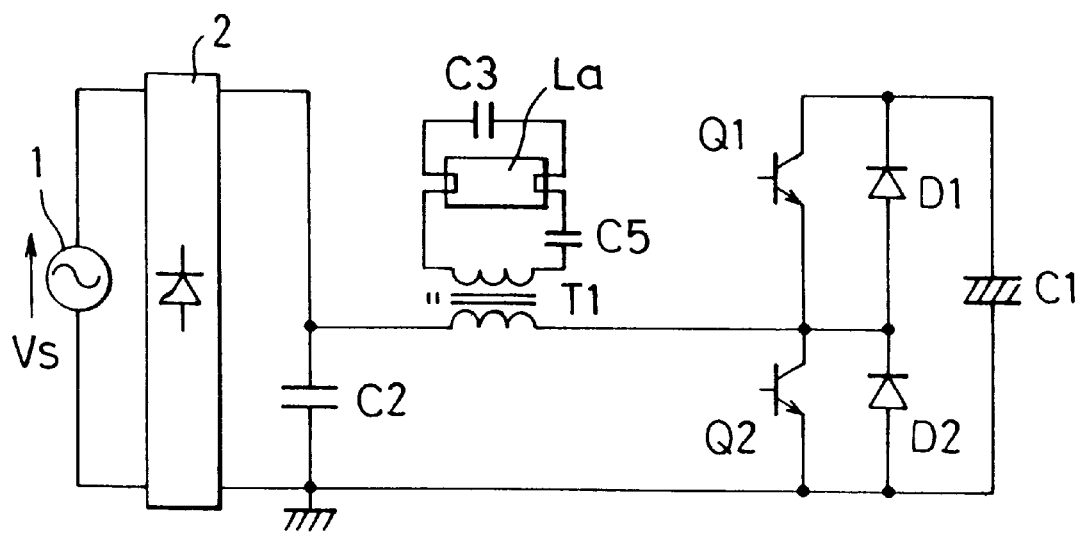

In another embodiment shown in FIG. 20 of the present invention, the arrangement is featured in that a capacitor C5 of a relatively large capacity is connected between one of the filaments of the discharge lamp La and the secondary winding of the transformer T1 in the arrangement of the embodiment shown in FIG. 1.

According to the present embodiment, it is possible to further improve the crest factor of the lamp current, since the DC component of the current supplied from the secondary winding of the transformer T1 to the discharge lamp La is removed by the capacitor C5.

The arrangement of the present embodiment should be applicable not only to the embodiment of FIG. 1 but also to the embodiment of FIG. 11, 12, 14–16 or 19.

Figure 21:
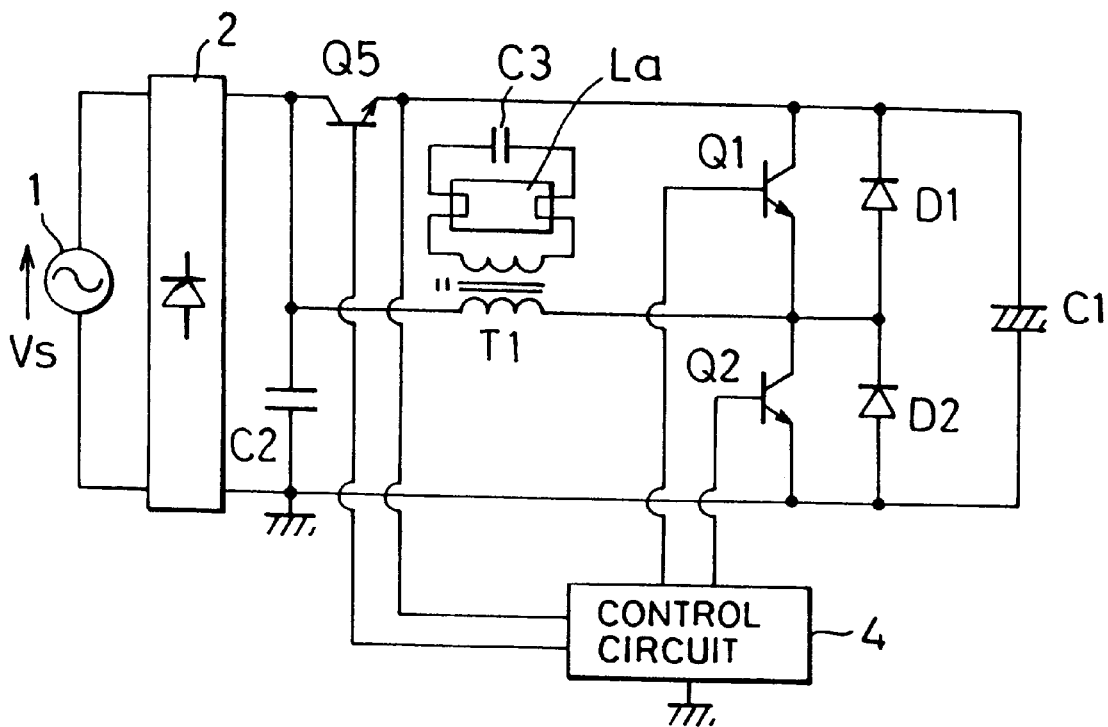

In another embodiment shown in FIG. 21 of the present invention, in contrast to the arrangement in the embodiment of FIG. 14, the arrangement is featured in that a switching element Q5 as a switching means for connecting and disconnecting the DC output terminals of the rectifier 2 to both ends of the capacitor C1 is connected as inserted between the higher potential side output terminal of rectifier 2 and the higher potential side end of the capacitor C1. This switching element Q5 is provided for ON/OFF driving by the control circuit 4, similar to the first and second switching elements Q1 and Q2.

According to the present embodiment, the switching element Q5 is made ON by the control circuit 4 in such an even when the power consumption at the load circuit 3 is reduced as the preheating or starting of the discharge lamp La or a non-load state at which the discharge lamp La is excluded from the load circuit 3, so that the both-end voltage Vc1 of the capacitor C1 will be clamped at the output voltage VDB of the rectifier 2, and thereby any abnormal voltage rise in the both-end voltage Vc1 of the capacitor C1 can be prevented. As a result, any damage of the elements due to the abnormal voltage rise in the both-end voltage Vc1 of the capacitor C1 can be avoided.

The arrangement of the present embodiment should be applicable not only to the embodiment of FIG. 14 but also to the embodiment of FIG. 15, 16, 19 or 20.

Figure 22:
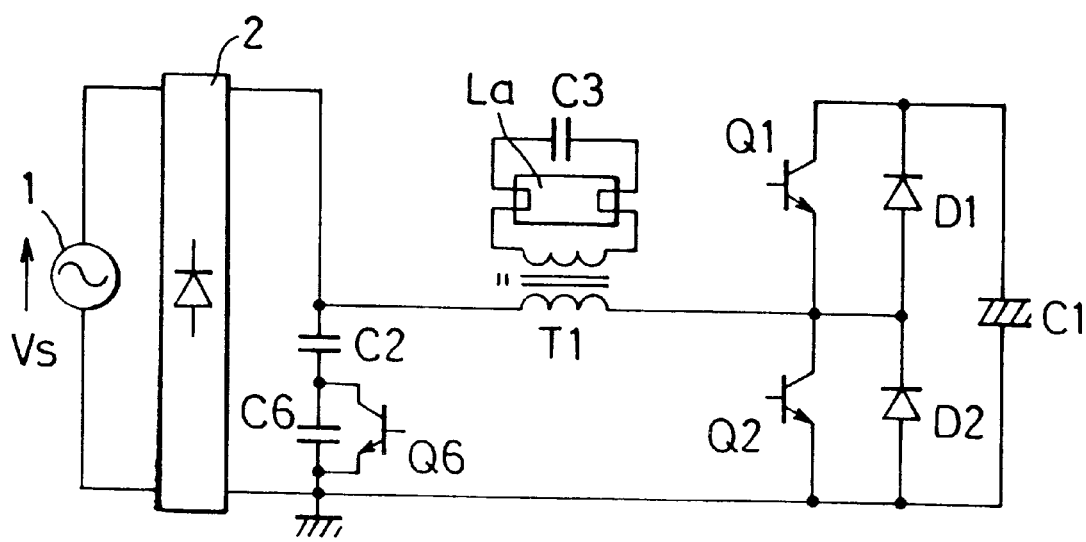

In another embodiment as shown in FIG. 22 of the present invention, the arrangement is featured in that, in contrast to the embodiment of FIG. 1, a capacitor C6 is connected across the output terminals of the rectifier 2 and in series with the capacitor C2, and a switching element Q6 is connected in parallel with this capacitor C6. That is, the capacitor connected to the output terminals of the rectifier 2 is made variable in its apparent capacity by connecting and disconnecting the capacitor C6 to the capacitor C2, with the switching element Q6 turned ON and OFF.

In the present embodiment, the capacitor C6 is short-circuited at both ends thereof with the switching element Q6 made ON upon rated lighting of the discharge lamp La, for example, whereas, in such event as the dimming where the circuit current flowing to the capacitor C2 decreases, the apparent capacity (composite capacity) of the capacity connected to the output terminals of the rectifier 2 is decreased by connecting the capacitor C6 in series with the capacitor C2, with the switching element Q6 made OFF. The voltage generated across the series circuit of the capacitors C2 and C6 can be thereby adjusted in the amplitude so as to fall substantially close to be zero volt even upon the dimming in which the circuit current decreases, there is generated no quiescent time in the input current Iin subjected to the filtering by means of any filter circuit not shown even upon the dimming, and it is made possible to restrain the higher harmonic component by rendering the waveform of the input current Iin to be substantially sinusoidal, and to maintain the input power factor to be high.

The arrangement of the present embodiment is applicable not only to the embodiment of FIG. 1 but also to the embodiment of FIG. 11, 12, 14, 15, 16, 19, 20 or 21.

Figure 23:
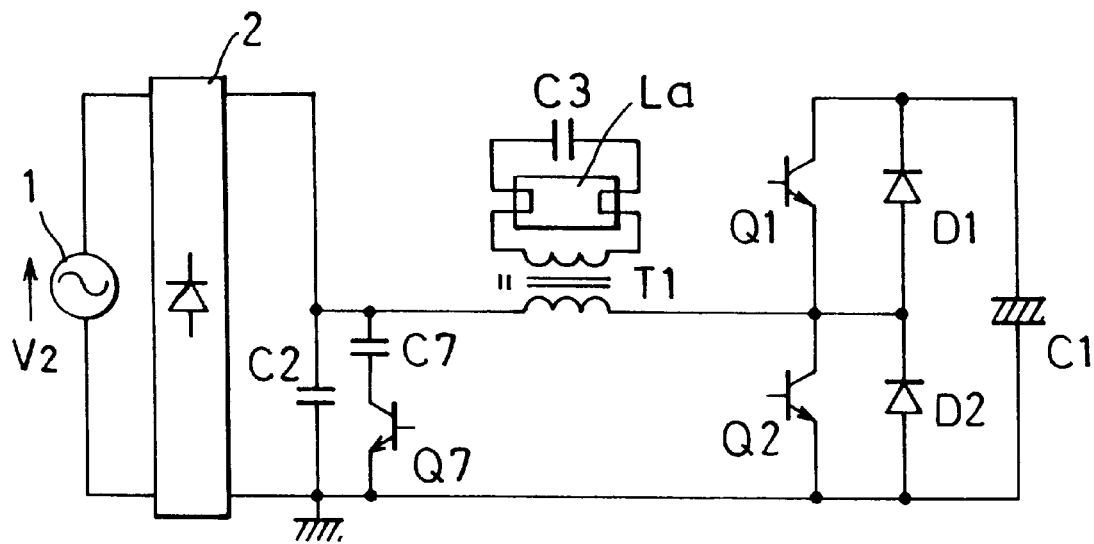

In another embodiment of the present invention as shown in FIG. 23, the arrangement is featured in that, with respect to the arrangement of the embodiment in FIG. 1, a series circuit of a capacitor C7 and a switching element Q7 is connected across the output terminals of the rectifier 2 and in parallel to the capacitor C2. That is, the arrangement is so made that the apparent capacity of the capacitor connected across the output terminals of the rectifier 2 will be made variable by connecting and disconnecting the capacitor C7 in parallel to the capacitor C2 with the switching element Q7 turned ON and OFF.

In the present embodiment, too, there is generated no quiescent time in the input current Iin subjected to the filtering by means of the filter circuit (not shown) even upon the dimming, similar to the embodiment of FIG. 22, and it is made possible to restrain the higher harmonic component with the waveform of the input current Iin made to be substantially sinusoidal and to maintain the input power factor to be high.

The arrangement of the present embodiment should be applicable not only to the embodiment of FIG. 1 but also to the embodiment of FIG. 11, 12, 14, 15, 16, 19, 20 or 21.

Figure 24:
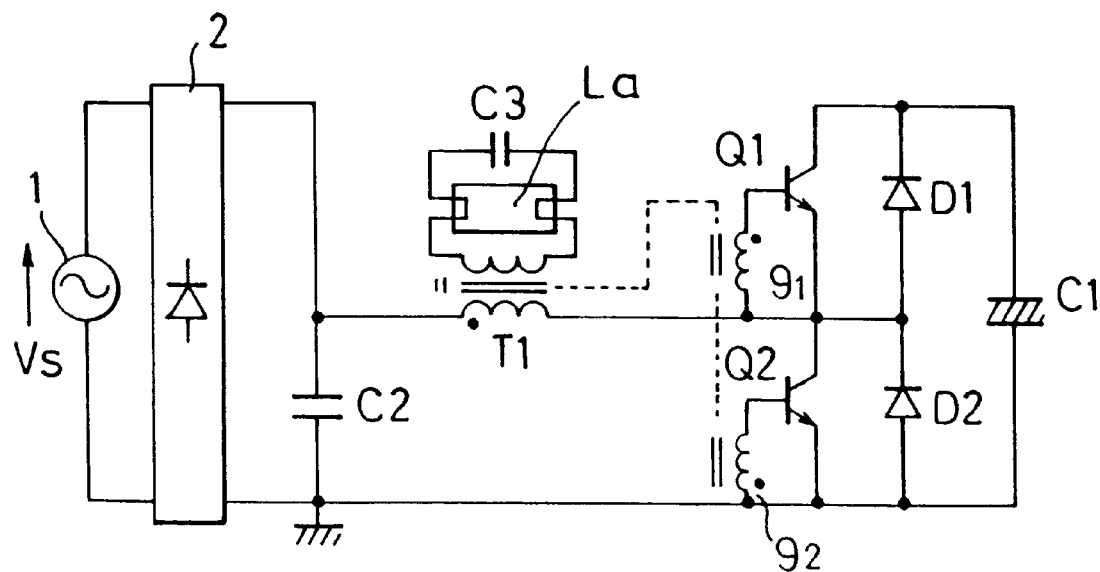

In another embodiment shown in FIG. 24, the arrangement is featured in that, with respect to the arrangement of the embodiment in FIG. 1, a pair of driving windings $9_1$ and $9_2$ are provided to the transformer T1 as means for driving the first and second switching elements Q1 and Q2, and these driving windings $9_1$ and $9_2$ are respectively connected as inserted between the base and emitter of each of the first and second switching elements Q1 and Q2, while the respective driving windings $9_1$ and $9_2$ are made mutually different in the polarity.

Thus, with a current flowing through the primary winding of the transformer T1, a driving voltage is induced alternately in the respective driving windings $9_1$ and $9_2$ and the first and second switching elements Q1 and Q2 are alternately driven to be ON and OFF by these induced voltages, so that the control circuit 4 for driving the first and second switching elements Q1 and Q2 is unnecessary, to be able to simplify the circuit arrangement for the dimensional minimization and cost reduction.

The same function and effect as in the above can be attained even when the driving windings $9_1$ and $9_2$ are provided on secondary side of a current limiting inductor connected in series with the primary or secondary winding of the transformer T1. In this case, there arises an advantage that the oscillation of the switching elements Q1 and Q2 can be automatically stopped upon such abnormal state as the non-load state, for example, by arranging the first and second to be driven by the driving windings provided on the secondary side of the current limiting inductor.

In other embodiments of the present invention shown in FIGS. 25(a)–25(d), they are featured in the arrangement of the load circuit 3 in which a plurality of the discharge lamps La1 . . . are provided as the load, while only two of them are shown here. In this case, the arrangement of the load circuit 3 may be of any one of the foregoing embodiments, and their illustration and details shall be omitted here.

Figure 25A:
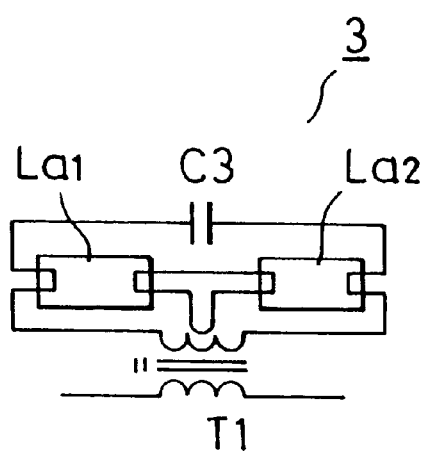
FIGS. 25(a)–25(d) are fragmentary schematic circuit diagrams showing other embodiments of the present invention.

In the arrangement shown in FIG. 25(a), one of the filaments in each of the pair of the discharge lamps La1 and La2 is connected at one end to the secondary winding of the transformer T1 and at the other end to the preheating capacitor C3, and the other filaments of the respective discharge lamps La1 and La2 mutually connected in series by coupling them to a tertiary winding of the transformer T1.

Figure 25B:
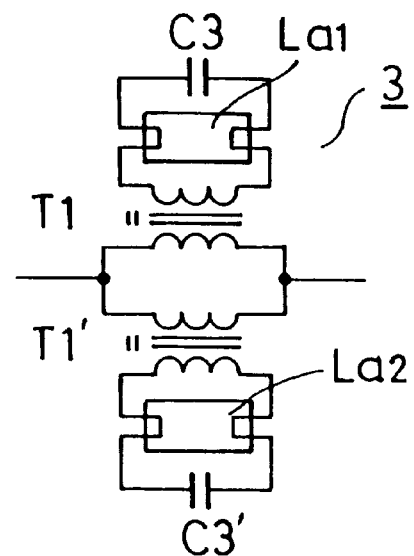
Figure 25C:
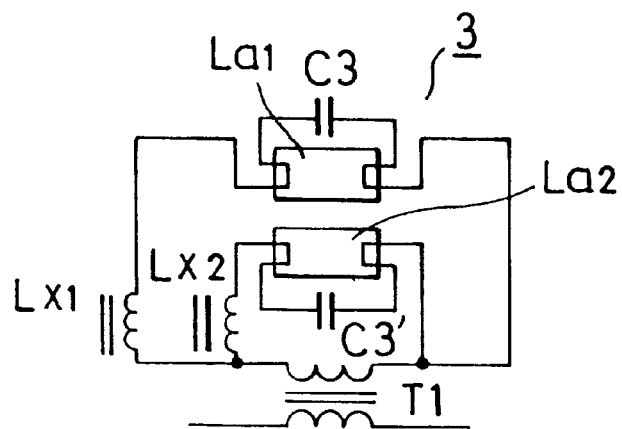

In the arrangement of FIG. 25(b), primary windings of a pair of the transformer T1 and T1' are connected mutually in parallel, and a pair of sets of the discharge lamp La1 or La2 and capacitor C3 or C3' are respectively connected to each of the secondary windings of the respective transformers T1 and T1'. In the arrangement of FIG. 25(c), a pair of the discharge lamps La1 and La2 are connected in parallel to the secondary winding of the transformer T1 through current limiting inductors Lx1 and Lx2 and capacitors C3 and C3'.

Figure 25D:
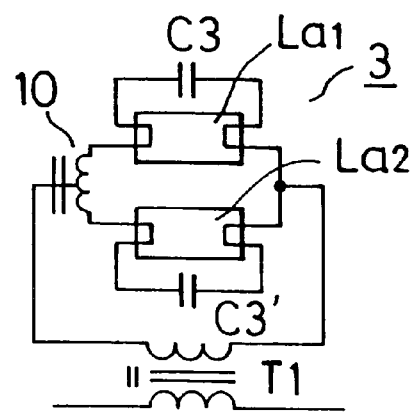

In the arrangement shown in FIG. 25(d), further, a balancer 10 is provided to the secondary winding of the transformer T1, and the pair of the discharge lamps La1 and La2 are connected to each terminal of this balance 10.

In any of the load circuits 3 in the respective embodiments as in the above, the plurality of the discharge lamps La1, La2 can be lighted by the high frequency power supplied through the transformer T1. In this case, the number of the discharge lamps La1 . . . provided to the load circuit 3 may not be limited only to two, it is possible to light the plurality of the discharge lamps with the load circuit 3 arranged in the same manner as in the above embodiments of FIG. 25 even with respect to three or more of the discharge lamps.

Figure 26:
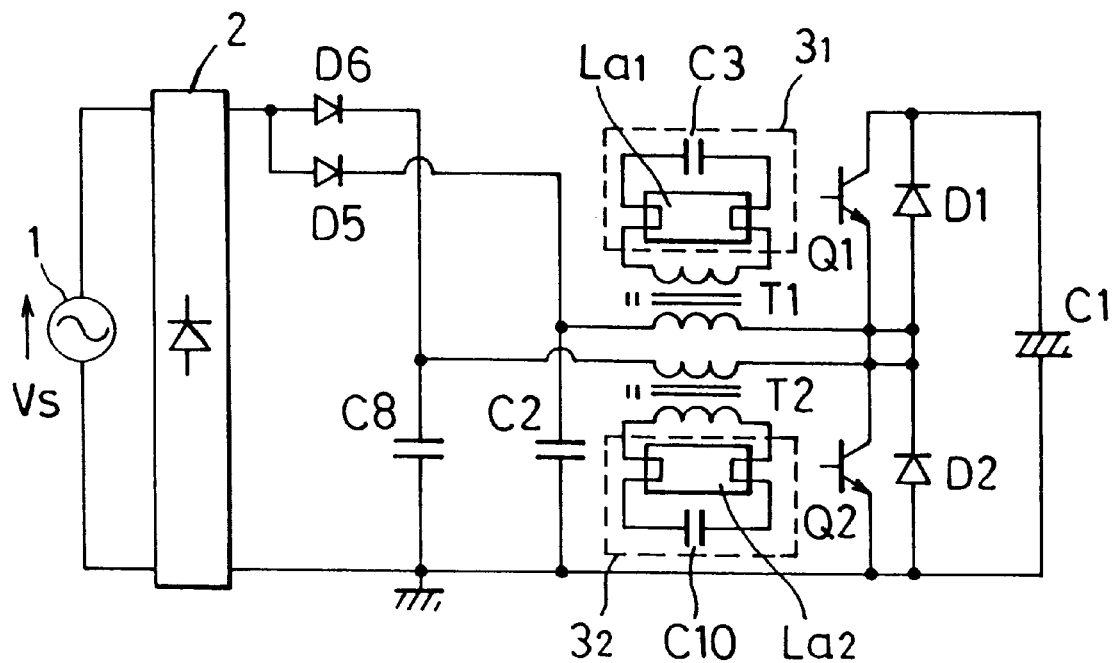
FIGS. 26 to 28 are schematic circuit diagrams showing respective other embodiments of the present invention.

In another embodiment shown in FIG. 26 of the present invention, the device comprises the rectifier 2 for rectifying the AC output of the AC poser source 1, the smoothing first capacitor C1, a series circuit of the pair of first and second switching elements Q1 and Q2 connected in parallel with the capacitor C1 and alternately turned ON and OFF at the high frequency, the first and second diodes D1 and D2 connected respectively in inverse parallel to the first and second switching elements Q1 and Q2, a pair of the transformers T1 and T2 respectively connected at the primary winding between the junction point of the first and second switching elements and the higher potential side output terminal of the rectifier 2, the load circuits $3_1$ and $3_2$ connected respectively to the secondary winding of each of the transformers T1 and T2, the second capacitors C2 and C8 connected respectively at one end to a junction point between the primary winding of each of the transformers T1 and T2 and the higher potential side output terminal of the rectifier 2 and at the other end to the lower potential side terminal of the capacitor C1 and forming a resonance circuit with the primary windings of the respective transformers T1 and T2, and two diodes D5 and D6 connected as inserted between the higher potential side output terminal of the rectifier 2 and junctions points between the respective primary windings of the transformers T1 and T2 and the capacitors C2 and C8 with the anode disposed on the side of the rectifier 2.

The present embodiment is different from the arrangement of the embodiment in FIG. 1 in respect that series circuits of the respective primary windings of the transformers T1 and T2 and the respective capacitors C2 and C8 are connected between the junction point of the first and second switching elements Q1 and,d Q2 and a lower potential side terminal of the capacitor C1, and that higher potential side terminals of the respective capacitors C2 and C8 are connected through the diodes D5 and D6 to the higher potential side terminal of the rectifier 2, but other respects and the operation are substantially the same and detailed description of the operation shall be omitted.

According to the present embodiment, it is possible to supply the high frequency power to the discharge lamp La1 and La2 in the load circuits $3_1$ and $3_2$ for their lighting by alternately turning ON and OFF the first and second switching elements Q1 and Q2, and, even when, for example, one discharge lamp La1 has been removed from the device, there occurs no change in the amplitude of the both-end voltage of the capacitor C8 corresponding to the residual load circuit $3_2$, so that there occurs no quiescent time in the input current so as to be able to maintain the input power factor at a high state. Further, also in such event as almost no voltage is caused to occur in the capacitor C2 corresponding to the load circuit $3_1$ from which the discharge lamp La1 has beem removed, the input current drawn from the AC power source 1 through the diode D5 becomes substantially zero, the input current decreases as the power consumption at the load circuit $3_1$ decreases, and any fluctuation in the both-end voltage Vc1 of the capacitor C1 can be also restrained.

While in respect of the present embodiment the description has been made with reference to the case where two of the transformers T1 . . . and load circuits $3_1$ . . . are provided, the invention is not to be limited only to this aspect but can be arranged in the same manner even in the case where three or more of the load circuits are employed. It should be also appreciated that the arrangement of the present embodiment is applicable not only to the embodiment of FIG. 1 but also to the embodiment of FIG. 11, 12, 14, 15, 16, 19, 20, 21, 22, 23 or 24.

Figure 27:
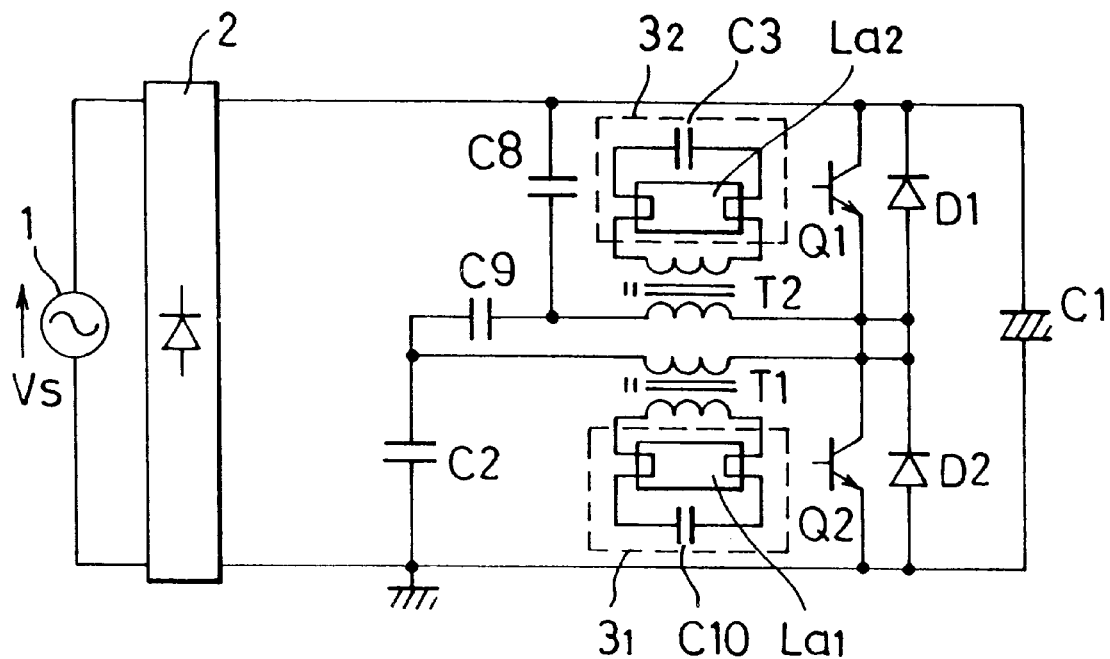

In another embodiment of the present invention as shown in FIG. 27, the device comprises the rectifier 2 for rectifying the AC output of the AC power source 1, the capacitor C1 for smoothing the pulsating output of the rectifier 2, a series circuit of a pair of the first and second switching elements Q1 and Q2 connected in parallel to the capacitor C1 and alternately turned ON and OFF at the high frequency, the first and second diodes D1 and D2 connected respectively in inverse parallel to the first and second switching elements Q1 and Q2 a pair of the transformers T1 and T2 to the secondary winding of which the respective load circuits $3_1$ and $3_1$ are connected, the capacitors C2 and C8 connected respectively across both ends of each of the first and second switching elements Q1 and Q2 and in series to each of the primary windings of the transformers T1 and T2 so as to form oscillation circuits, and a capacitor C9 connected between a junction of the primary winding of the transformer T1 and capacitor C2 and a junction of the primary winding of the transformer T2 and capacitor C8.

In this case, the present embodiment is different from the embodiment of FIG. 1 in respect that another series circuit (of the transformer T2 and capacitor C8) of the same arrangement as the series circuit of the transformer T1 and small capacity capacitor C2 and connected across the second switching element Q2 is connected in parallel across the first switching element Q1, and that the capacitor C9 is connected as inserted between the junction of the transformer T1 and capacitor C2 and the junction of the transformer T2 and capacitor C9, but other respects and operation are the same. Therefore, the operation in a mode where the input current Iin flows from the AC power source 1 only shall be described.

When, first, the first switching element Q1 is ON and the second switching element Q2 is OFF, a current flows through a path of the AC power source 1→rectifier 2→first switching element Q1→transformer T2→capacitor C9→capacitor C2→rectifier 2→AC power source 1. When on the other hand the first switching element Q1 is OFF and the second switching element Q2 is ON, a current flows through a path of the AC power source 1→rectifier 2→capacitor C8→capacitor C9→transformer T1→second switching element Q2→rectifier 2→AC power source 1. According to the present embodiment, in this manner, it is enabled to draw in the input current Iin from the AC power source 1 in either case when either one of the first and second switching elements Q1 and Q2 is ON, so that the input current Iin flows substantially in all range of one cycle of the source power, and there arises an advantage that the peak value of the input current Iin can be kept small. It is also advantageous that the dimensional minimization and cost reduction of the circuit can be realized.

Further, while in the present embodiment the number of the discharge lamp as the load has been described to be two, the invention is not limited to this, but can be arranged in the same manner even when three or more of the discharge lamps are provided. In an event where, for example, five discharge lamps are provided, the load circuit $3_1$ having two discharge lamps is connected to one transformer T1, while the load circuit $3_2$ having three discharge lamps is connected to the other transformer T2, then any difference in the input current Iin flowing upon turning ON of each of the first and second switching elements Q1 and Q2 becomes smaller, and the peak value of the input current Iin can be made the smallest. When the discharge lamps are in an even number, the arrangement may be so made that the load circuits $3_1$ and $3_1$ connected to the respective transformers T1 and T2 will have the same number of the discharge lamps.

Figure 28:
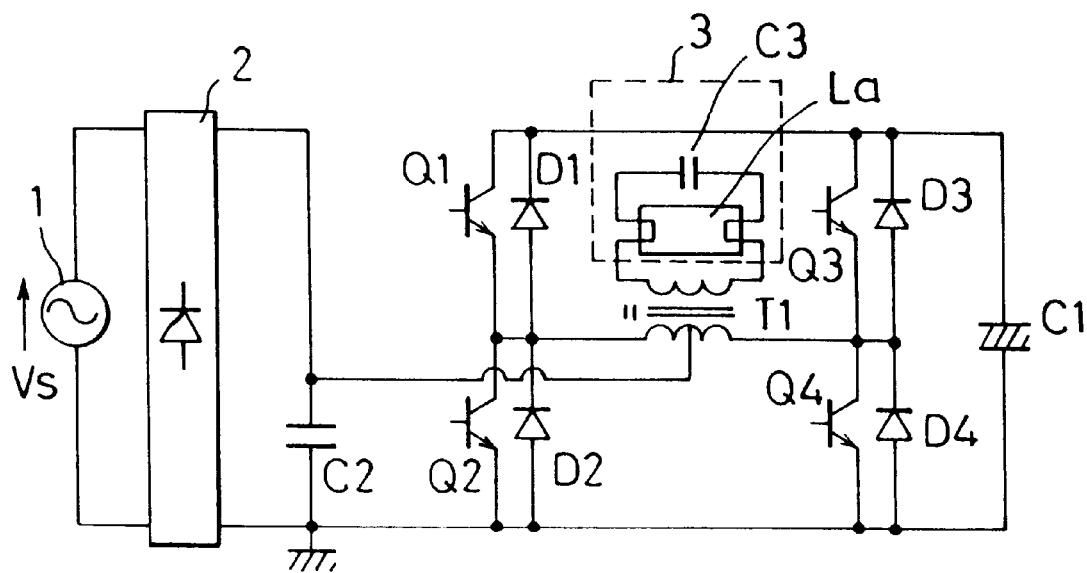

In another embodiment of the present invention as shown in FIG. 28, the device comprises the rectifier 2 for rectifying the AC output of the AC power source 1, the smoothing capacitor C1, series circuits of a pair of the first and second switching elements Q1 and Q2 and of a pair of third and fourth switching elements Q3 and Q4 respectively connected in parallel to the capacitor C1 for turning alternately ON and OFF at a high frequency, the first and second diodes D1 and D2 as well as third and fourth diodes D3 and D4 respectively connected in inverse parallel to each of the first to fourth switching elements, the transformer T1 the primary winding of which is connected between the junction point of the first and second switching elements Q1 and Q2 and the junction of the third and fourth switching elements, a load circuit connected to the secondary winding of the transformer T1, and the capacitor C2 connected across the DC output terminals of the rectifier 2, wherein an intermediate tap provided substantially at middle point of the primary winding of the transformer T1 is connected through the capacitor C2 to one terminal of the capacitor C1, and a resonance circuit is formed with the primary winding of the transformer T1 and capacitor C2 for resonance in accordance with the ON/OFF operation of the first to fourth switching elements Q1–Q4.

The present embodiment is, in contrast to the arrangement of the so-called half-bridge type embodiment, a full-bridge type circuit arrangement is formed by connecting the series circuit of the third and fourth switching elements Q3 and Q4 to which the diodes D3 and D4 are connected in inverse parallel to both ends of the capacitor C1 in parallel to the first and second switching elements Q1 and Q2, so that a pair of mutually diagonally positioned first and fourth switching elements Q1 and Q4 and the other pair of the remaining second and third switching elements Q2 and Q3 are alternately made ON and OFF.

In an event where the first and fourth switching elements Q1 and Q4 are ON and the second and third switching elements Q2 and Q3 are OFF, then a current first flows through a path of the transformer T1→diode D1→capacitor C1→diode D4→transformer T1 as well as through a path of the transformer T1→capacitor C2→diode D4→transformer T1 (mode 1), next a current flows through a path of the capacitor C1→first switching element Q1→transformer T1→fourth switching element Q4→capacitor C1 as well as a path of the capacitor C2→transformer T1→fourth switching element Q4→capacitor C2 (mode 2), and further a current flows through a path of the capacitor C1→first switching element Q1→transformer T1→fourth switching element Q4→capacitor C1 as well as a path of the AC power source 1→rectifier 2→transformer T1→fourth switching element Q4→rectifier 2→AC power source 1 (mode 3).

In an event when the first and fourth switching elements Q1 and Q4 are OFF and the second and third switching elements Q2 and Q3 are ON, the current first flows through a path of the transformer T1→diode D3→capacitor C1→diode D2→transformer T1 as well as a path of the transformer T1→capacitor C2→diode D2→transformer T1 (mode 4), next a current flows through a path of the capacitor C1→third switching element Q3→transformer T1→second switching element Q2→capacitor C1 as well as a path of the capacitor C2→transformer T1→second switching element Q2→capacitor C2 (mode 5), and further a current flows through a path of the capacitor C1→third switching element Q3→transformer T1→second switching element Q2→capacitor C1 as well as a path of the AC power source 1→rectifier 2→transformer T1→second switching element Q2→rectifier 2→AC power source 1 (mode 6).

In the present embodiment, therefore, the current is enabled to flow substantially through the whole range of the source power cycle of the AC power source 1 by drawing in the input current Iin from the source 1 in the above modes 3 and 6, so that the higher harmonic component in the input current Iin can be restrained and the input power factor can be elevated. Further, similar to the embodiment of FIG. 27, the input current Iin can be drawn in from the AC power source 1 even when either pair of the respective switching elements Q1, Q4 and Q2, Q3 are ON, so as to cause the input current Iin to flow substantially in all range of each cycle of the source power, and there arises an advantage that the peak value of the input current Iin can be kept smaller than in the embodiment of FIG. 1.

Figure 29:
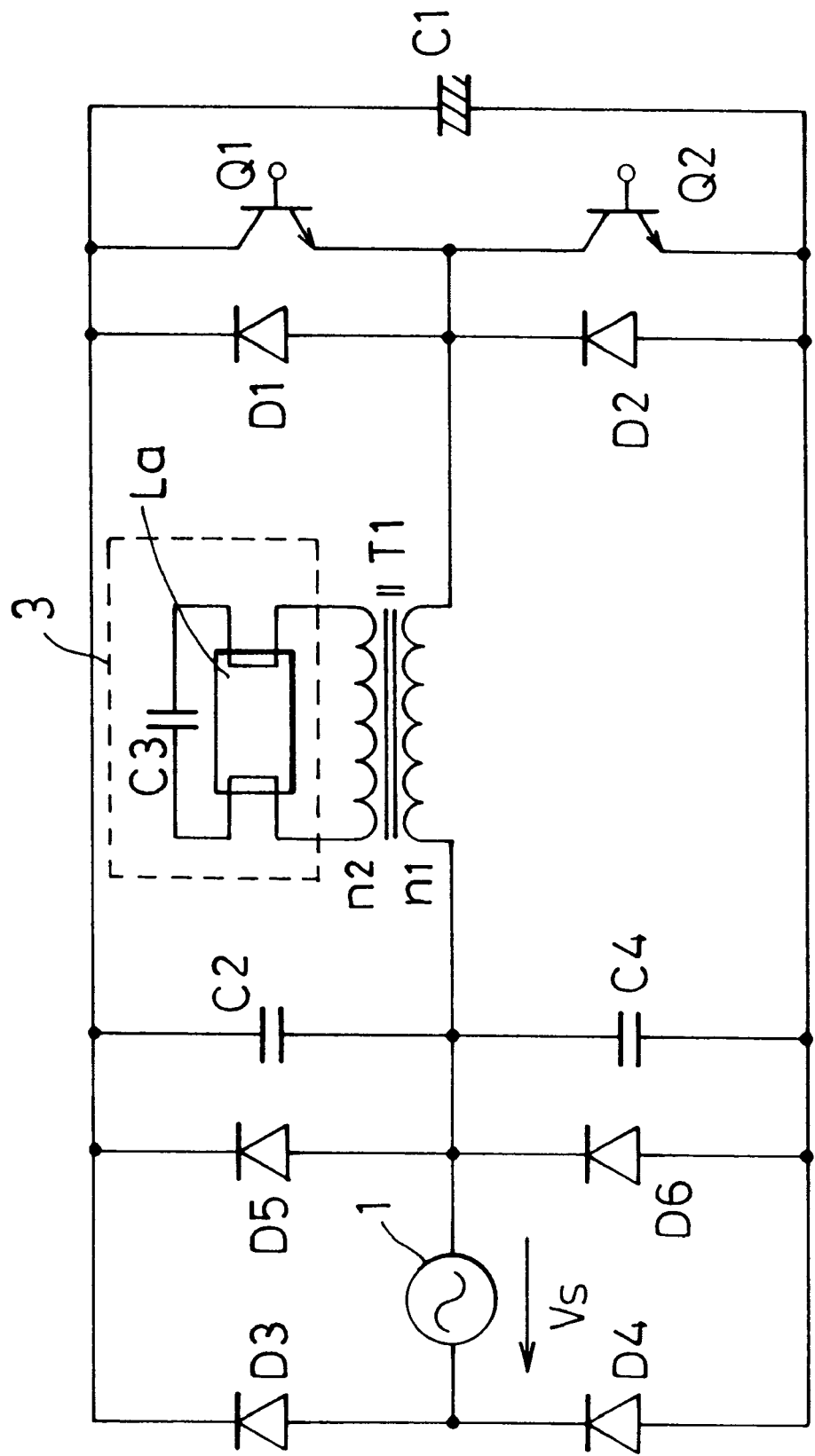
FIG. 29 is a schematic circuit diagram showing another embodiment of the power source device according to the present invention.

In FIG. 29, still another embodiment of the power source device according to the present invention is shown, in which the primary winding n1 of the leakage transformer T1 is connected in series to the AC power source 1, the load circuit is formed with the discharge lamp La connected to the secondary winding n2 of the leakage transformer T1 and capacitor C3, and the primary winding n1 of the leakage transformer T1 is forming an inductance element of a boost converter. Also in the present embodiment, a full-wave rectifier is formed with the diodes D1–D4.

In the present embodiment, the cischarge lamp La as the load is connected to the secondary winding n2 of the leakage transformer T1 so that, even when a low frequency component of the current flows to the primary winding n1 of the transformer T1, almost none of this low frequency component is caused to be transmitted to the side of the secondary winding n2, and it is possible to restrain the low frequency component from flowing to the discharge lamp La connected to the secondary winding n2, and to prevent any flickering of the discharge lamp La from occurring.

Further, as has been referred to in the above, the inductance element of the boost converter by means of the primary winding n1 of the leakage transformer T1, and this inductance element will be of a relatively low impedance (acting as a low pass filter) at a frequency (50 Hz or 60 Hz) of the AC power source 1 of a commercial power source, as compared with a circuit in which a capacitor is connected as has been known. In the present embodiment, therefore, it is possible specifically to stabilize the supply of input power.

Further, the inductance element functions as a constituting element of the boost converter as a result of the alternate ON and OFF of the switching elements Q1 and Q2 at a frequency sufficiently higher than the frequency of the AC power source 1. In the followings, this operation shall be described.

When the voltage Vs of the AC power source 1 is in positive polarity (In FIG. 29, the direction of allow for Vs is regarded to be positive) while the switching element Q1 is ON and the switching element Q2 is OFF, an inverter current flows through a path of the smoothing capacitor C1→switching element Q1→primary winding n1→capacitor C4→smoothing capacitor C1 as sell as a path of the capacitor C2→switching element Q1→primary winding nl→capacitor C2, a high frequency current is transmitted to the secondary winding n2 coupled to the primary winding n1, and a current flows to the discharge lamp La.

On the other hand, the input current flows through a path of the AC power source 1→diode D3→switching element Q1→primary winding n1→AC power source 1, and an energy is accumulated in the inductance element formed by the primary winding n1. When the voltage Vs of the AC power source 1 is in the positive polarity while the switching element Q1 is OFF and the switching element Q2 is ON, the inverter current flows through a path of the smoothing capacitor C1→capacitor C2→primary winding n1→switching element Q2→smoothing capacitor C1 as well as a path of the capacitor C4→primary winding n1→switching element Q2→capacitor C4, a high frequency current is transmitted to the secondary winding n2 coupled to the primary winding n1.

On the other hand, the energy accumulated in the inductance element formed by the primary winding n1 during the ON state of the switching element Q1 is discharged through a path of the primary winding n1→AC power source 1→diode D3→smoothing capacitor C1→diode D2→primary winding n1, and the smoothing capacitor C1 is charged. That is, when the voltage Vs of the AC power source 1 is in the positive polarity, the switching element Q1 has the function of the switching element of the boost converter as well as the function of the switching element of the inverter, while the switching element Q2 has the function of the inverter only.

When the voltage Vs of the AC power source 1 is in negative polarity, on the other hand, the switching element Q2 has both functions of the switching elements of the boost converter and the inverter, while the switching element Q1 has the function of the switching element of the inverter only.

The diodes D5 and D6 receive almost none of the current except for initial charging period of the smoothing capacitor C1 upon connection of the power source, but are effective to perform a function of preventing the capacitors C3 and C4 from being charged in inverse direction and maintaining any input current distortion to be the minimum.

Now, in the present embodiment, it is possible to prevent the current of low frequency component from flowing to the discharge lamp La as the load, by means of the leakage transformer T1. The current or improving the input current distortion flows to the primary winding n1 of the leakage transformer T1, and the inductance element formed by the primary winding n1 is of a low impedance with respect to the AC power source 1, so that there will occur no shortage of the input current as in the conventional devices, and it is enabled to reduce the low frequency component of the current flowing to the load while maintaining the input current distortion to be small.

Figure 30:
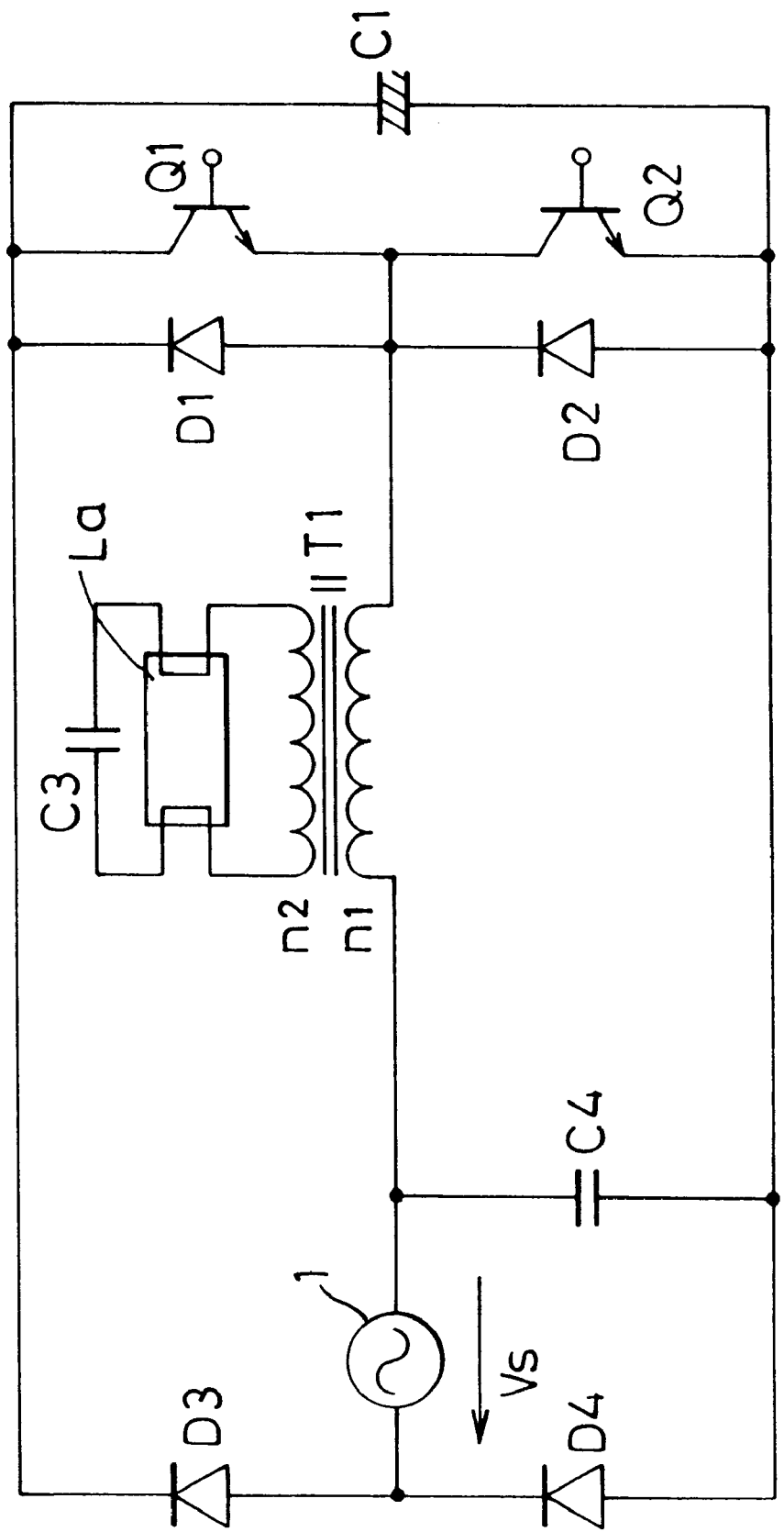
FIGS. 30 to 39 are schematic circuit diagrams showing still further embodiments of the present invention, respectively.

In another embodiment of the present invention as shown in FIG. 30, an arrangement substantially the same as that of the embodiment of FIG. 29 except that the diodes D5 and D6 and the capacitor C2 are omitted therefrom is adopted.

In this case, the voltage Vs of the AC power source 1 held in the positive polarity while the switching element Q1 is ON and the switching element Q2 is OFF, causes a current of inverter operation to flow through a path of the smoothing capacitor C1→switching element Q1→primary winding n1→capacitor C4→smoothing capacitor C1 and a current of chopper operation to flow through a path of the AC power source 1→diode D3→switching element Q1→primary winding n1→AC power source 1.

With the voltage Vs of the AC power source 1 held in the positive polarity while the switching element Q1 is OFF and the switching element Q2 is ON, the current of inverter operation flows through a path of the capacitor C4→primary winding n1→switching element Q2→capacitor C4, and the energy accumulated in the inductance element comprised of the primary winding n1 is discharged through a path of the primary winding n1→AC power source 1→diode D3→smoothing capacitor C1→diode D2→primary winding n1, to charge the smoothing capacitor C1.

In the present embodiment, too, similar to the embodiment of FIG. 29, the voltage Vs of the AC power source 1 in the positive polarity causes the switching element Q1 to have both functions of the switching element of the boost converter and of the switching element of the inverter. When the voltage Vs of the AC power source 1 is in the negative polarity, the switching element Q2 has both functions of the switching element of the boost converter and of the switching element of the inverter, while the switching element Q1 has the function of the switching element of the inverter only.

Other respects of the arrangement and its function and effect of the present embodiment are the same as those in the embodiment of FIG. 29.

Figure 31:
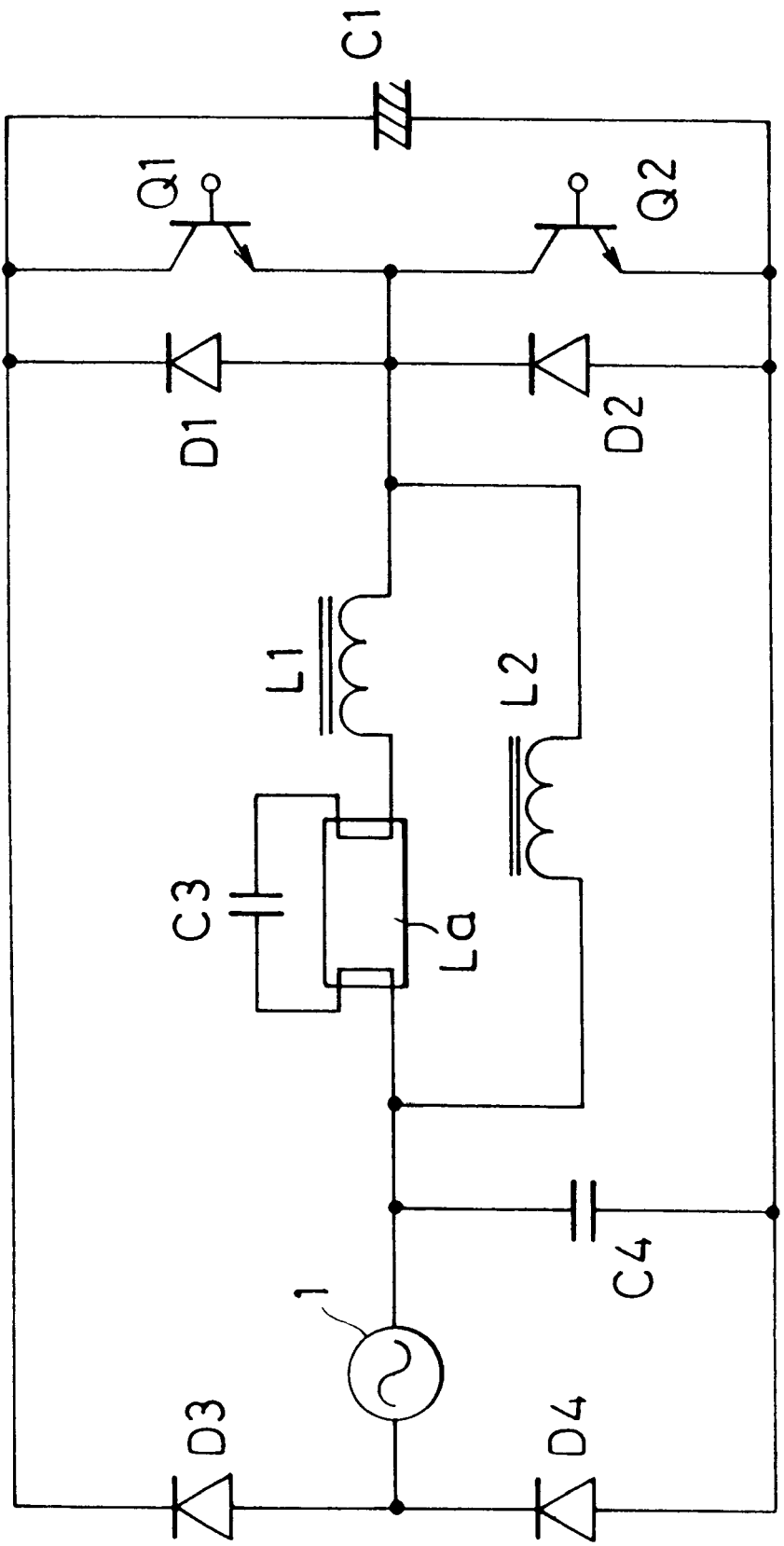

In another embodiment of the present invention as shown in FIG. 31, an inductor L2 is connected in series to the AC power source 1, instead of the primary winding n1 of the leakage transformer T1 connected to the AC power source 1 as in the embodiment of FIG. 30, and a resonance load circuit of an inverter comprising the inductor L1, discharge lamp La and capacitor C3 is connected in parallel to the inductor L2.

In the present embodiment, the low frequency current of the frequency of the AC power source 1 flows mainly to the inductor L2, while the high frequency current accompanying to the switching frequency of the switching elements Q1 and Q2 flows to the side of the resonance load circuit comprised of the inductor L1, discharge lamp La and capacitor C3. Also in the present embodiment, therefore, it is possible to reduce the low frequency component of the current flowing to the discharge lamp La as the load. Since The inductor L2 is of a low impedance with respect to the AC power source 1, there arises no such shortage of the input power as in the conventional devices.

Also in the present embodiment, the reduction of the low frequency component in the current flowing to the load can be achieved while maintaining tie input current distortion to be small. Other respects of the arrangement, function and effect of the present embodiment are the same as those in the embodiment of FIG. 30.

Figure 32:
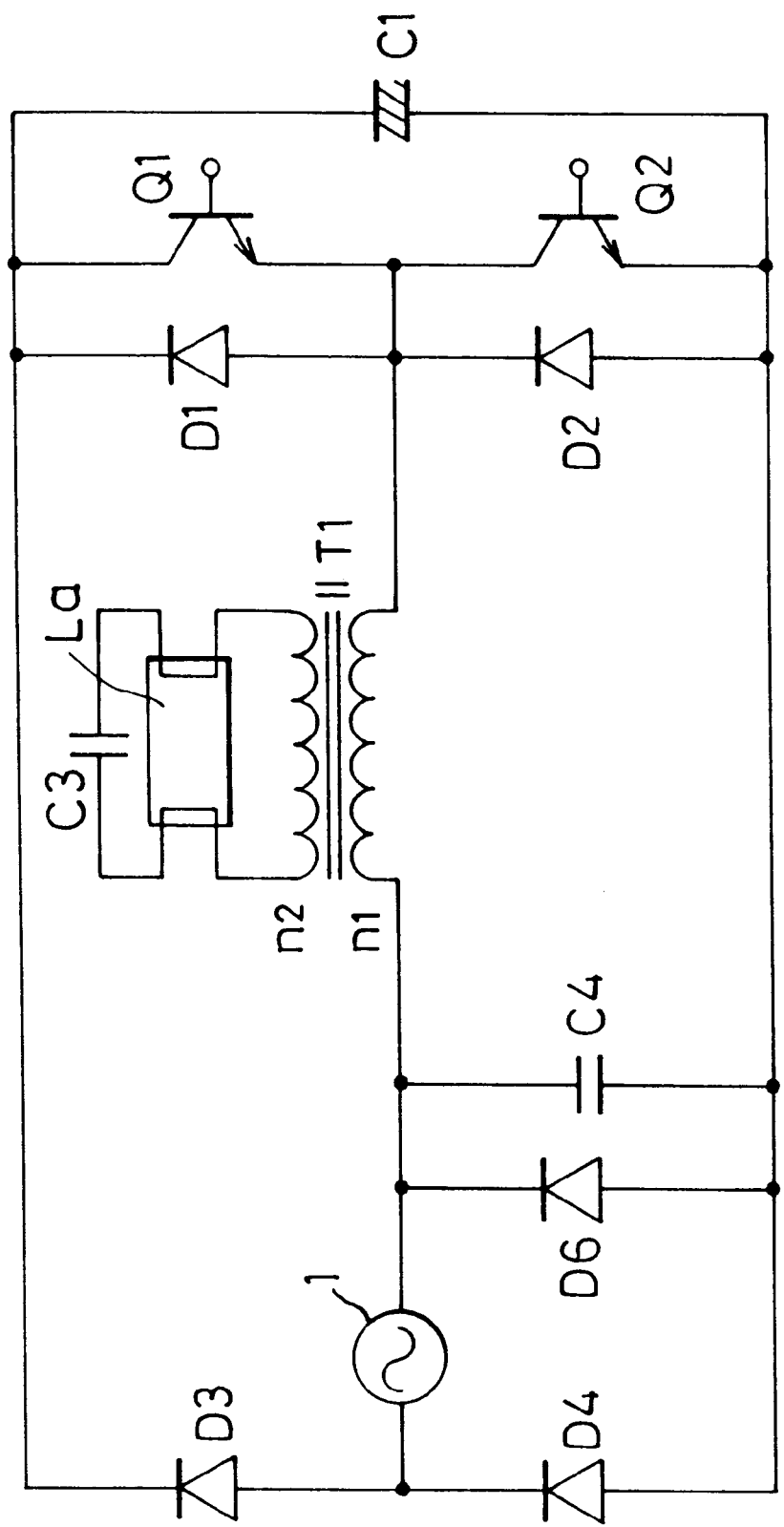

In another embodiment of the present invention as shown in FIG. 32, a diode D6 is connected in inverse parallel to the capacitor C4 in the embodiment of FIG. 30.

In this case, the diode D6 limits charging direction of the capacitor C4 to one direction only, so that the capacitor C4 can be prevented from being inversely charged, and the arrangement is effective to lower the applied voltage to the capacitor C4. Other respects of the arrangement, function and effect are substantially the same as those in the embodiment of FIG. 30.

Figure 33:
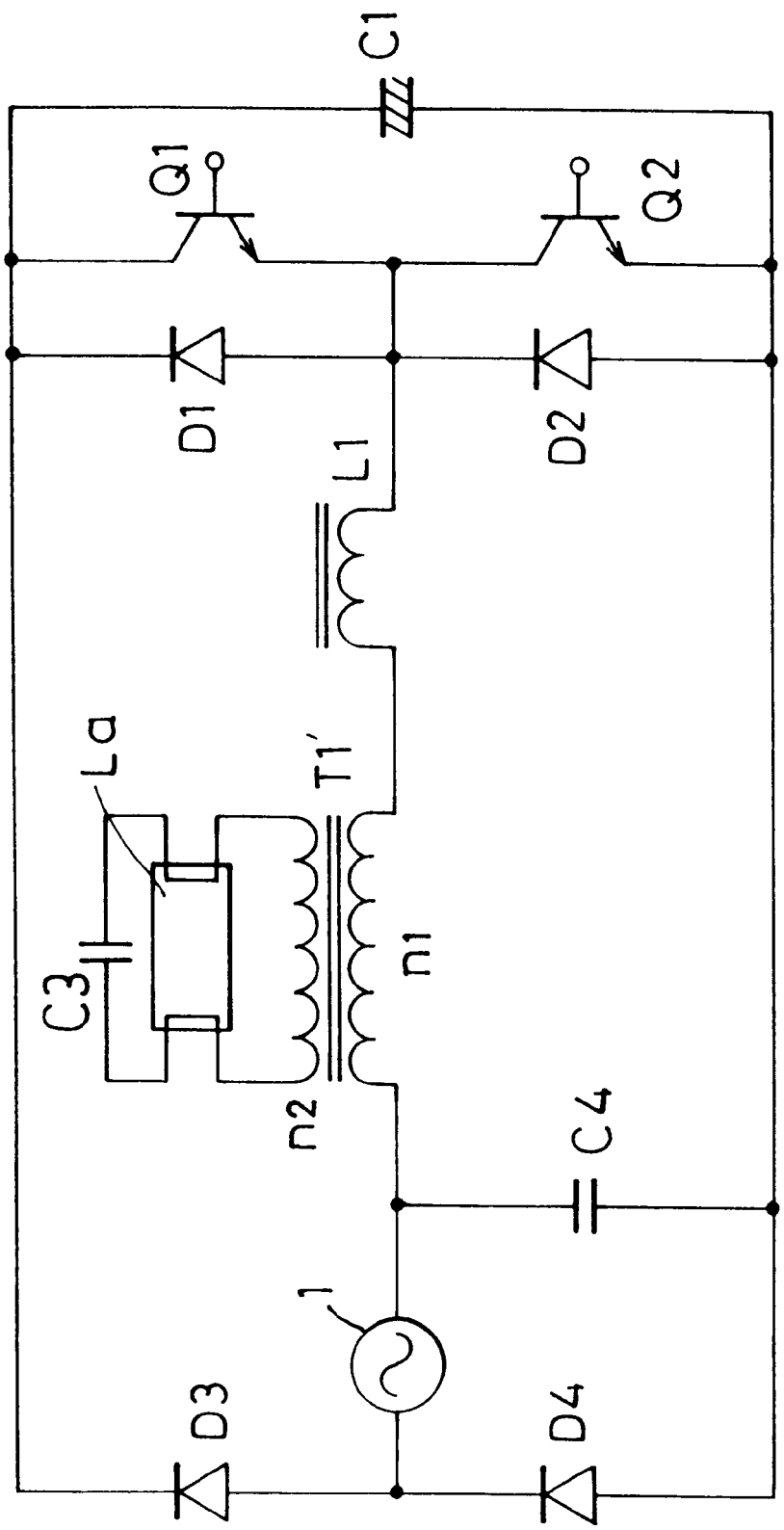

In another embodiment of the present invention as shown in FIG. 33, a transformer T1' is employed in place of the leakage transformer T1, and a leakage part of the leakage transformer T1 is constitute by an inductor L1 connected in series with the primary winding n1. In this case, the inductor L1 is connected between the primary winding n1 and a junction of the diodes D1 and D2.

In the present embodiment, the current flowing to the discharge lamp La as the load is subjected to the cutting of the low frequency component by means of the transformer T1. Further, the series circuit of the inductor L1 and an inductance element constituted by the primary winding n1 is of a lower impedance with respect to the AC power source 1 than in a conventional case where a capacitor is provided instead. Consequently, there occurs no shortage of the input power in the present embodiment, too, and the low frequency component of the current flowing to the load can be reduced while keeping the reduced state of the distortion in the input current.

Figure 34:
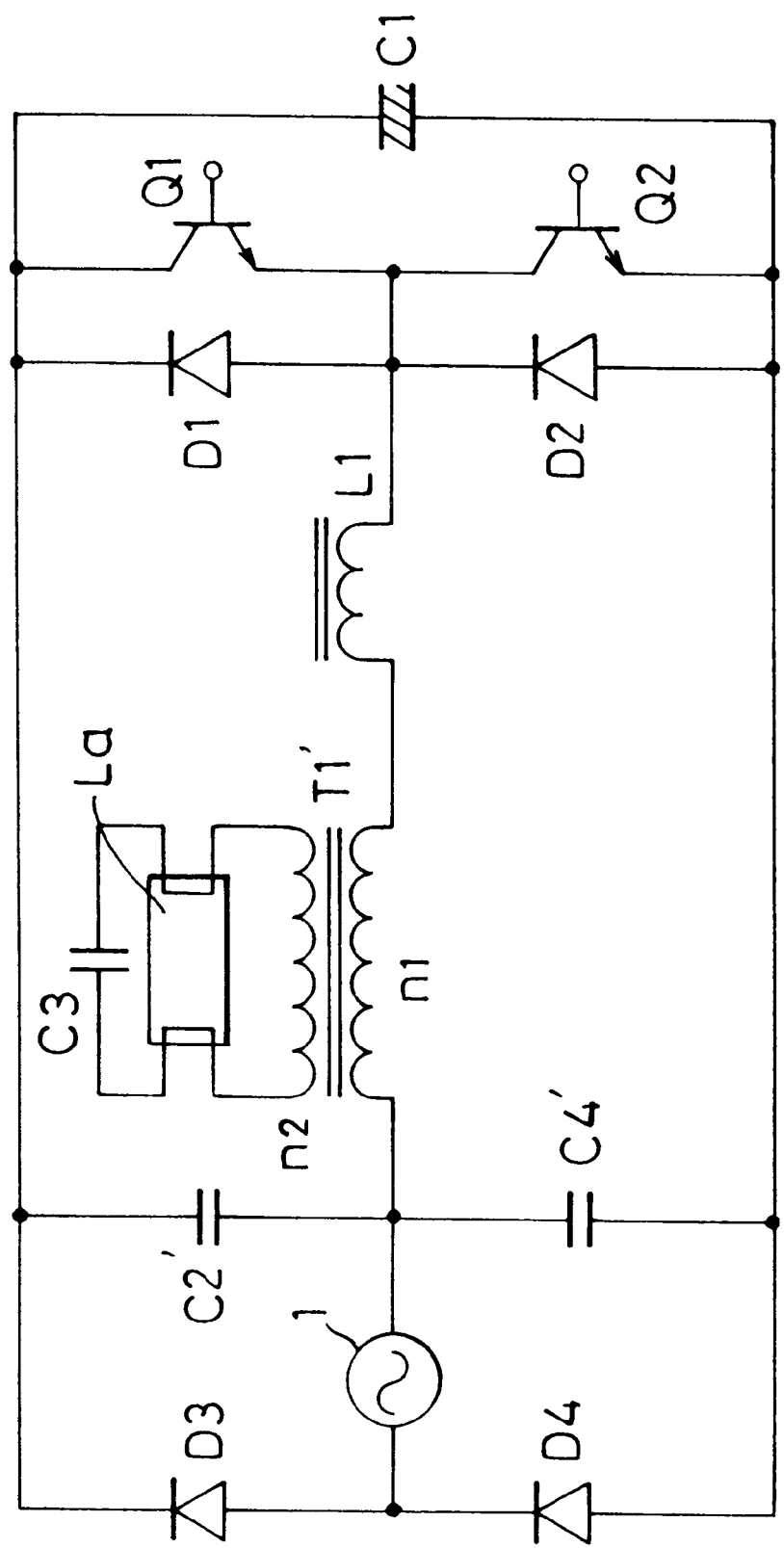

In another embodiment shown in FIG. 34 of the present invention, a capacitor C4' of a capacity about one half of that of the capacitor C4 is connected in place of the capacitor C4 in the embodiment of FIG. 33, and a further capacitor C2' substantially of the same capacity as the capacitor C4' is connected in series with the capacitor C4'. At this time, the capacity connected in series to the primary winding n1 will be (C2'+C4'), and the capacity as viewed from the side of the primary winding n1 will be the same as that in the embodiment of FIG. 33. Other respects of the arrangement, function and effect of this embodiment are substantially the same as those in the embodiment of FIG. 33.

Figure 35:
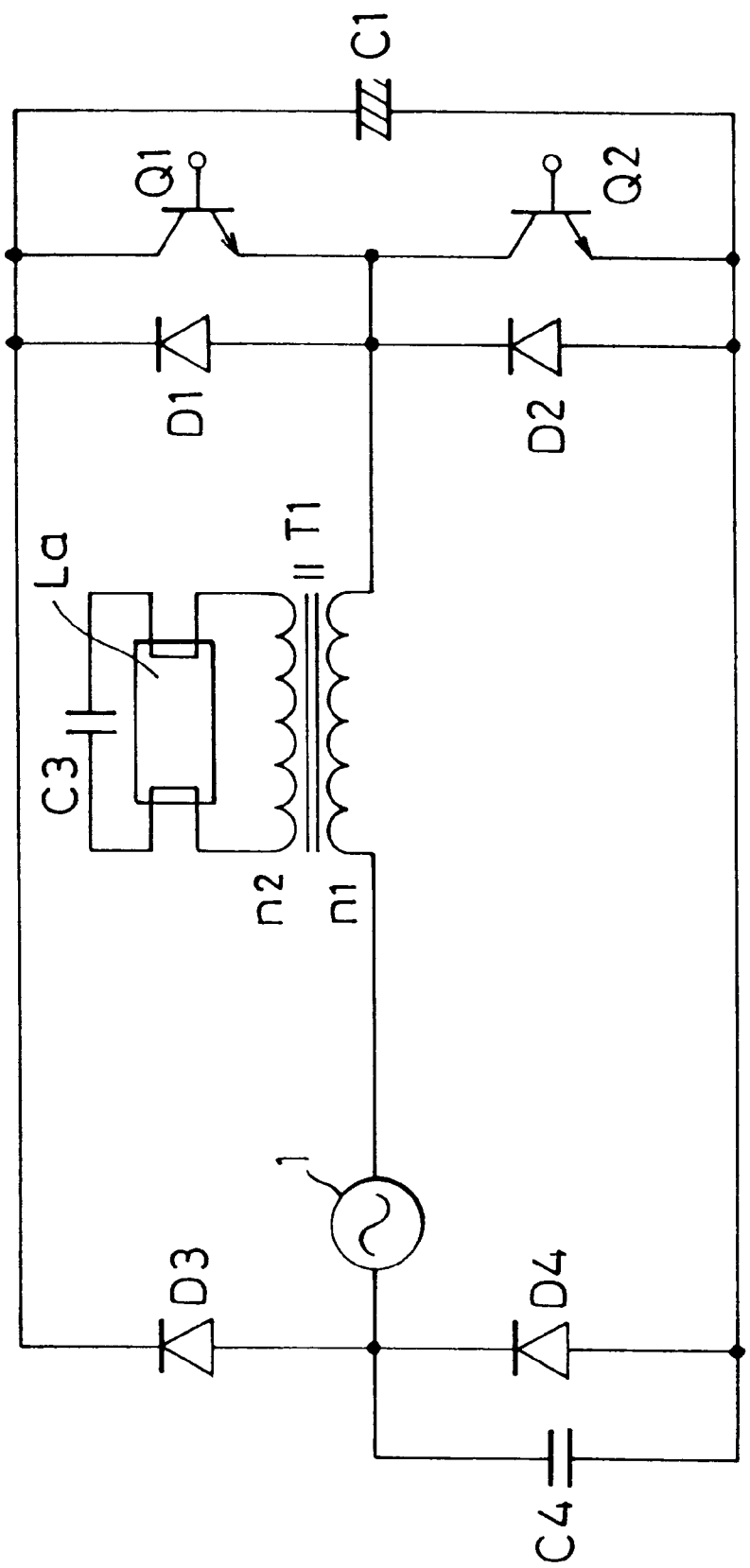

In another embodiment of the present invention as shown in FIG. 35, the capacitor C4 in the embodiment of FIG. 30 is arranged to be connected across the diode D4 without interposition of the AC power source 1. In this embodiment, taking into account the capacity component connected in series to the primary winding n1 of the leakage transformer T1, the capacitor C4 is connected to the primary winding n1 through the AC power source 1, and the capacity seen from the side of the primary winding n1 is the same as that in the embodiment of FIG. 30.

Other respects of the arrangement, function and effect of this embodiment are substantially the same as those in the embodiment of FIG. 30.

Figure 36:
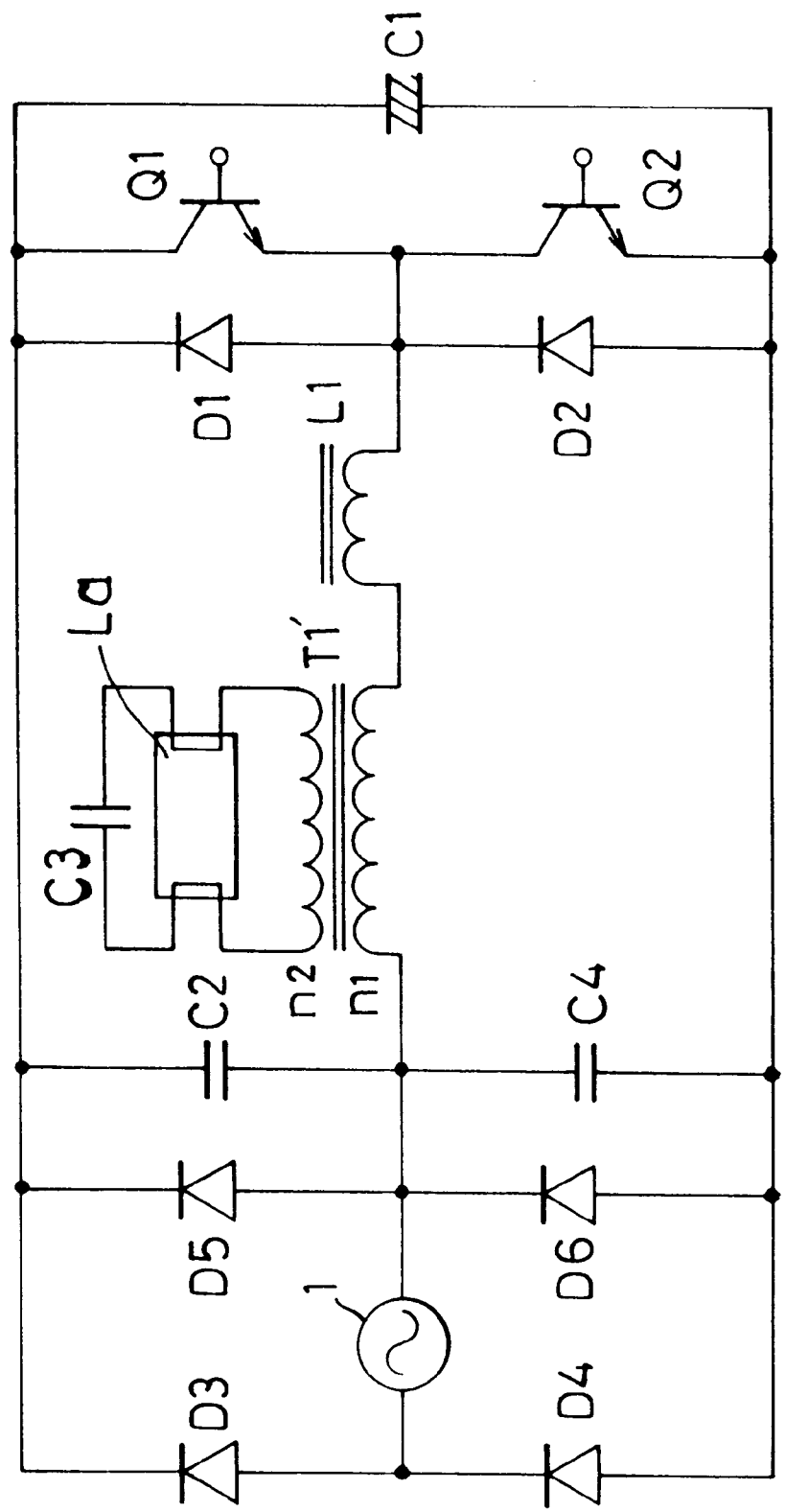

In another embodiment shown in FIG. 36 of the present invention, a transformer T1' is employed in place of the leakage transformer T1 in the embodiment of FIG. 29, and the leakage part of the leakage transformer T1 is constituted by the inductor L1 connected in series to the primary winding n1. In this case, the inductor L1 is connected between the primary winding n1 of the transformer T1' and a junction point of the diodes D1 and D2. Other respects, function and effect of the arrangement of this embodiment are substantially the same as those in the embodiment of FIG. 29.

Figure 37:
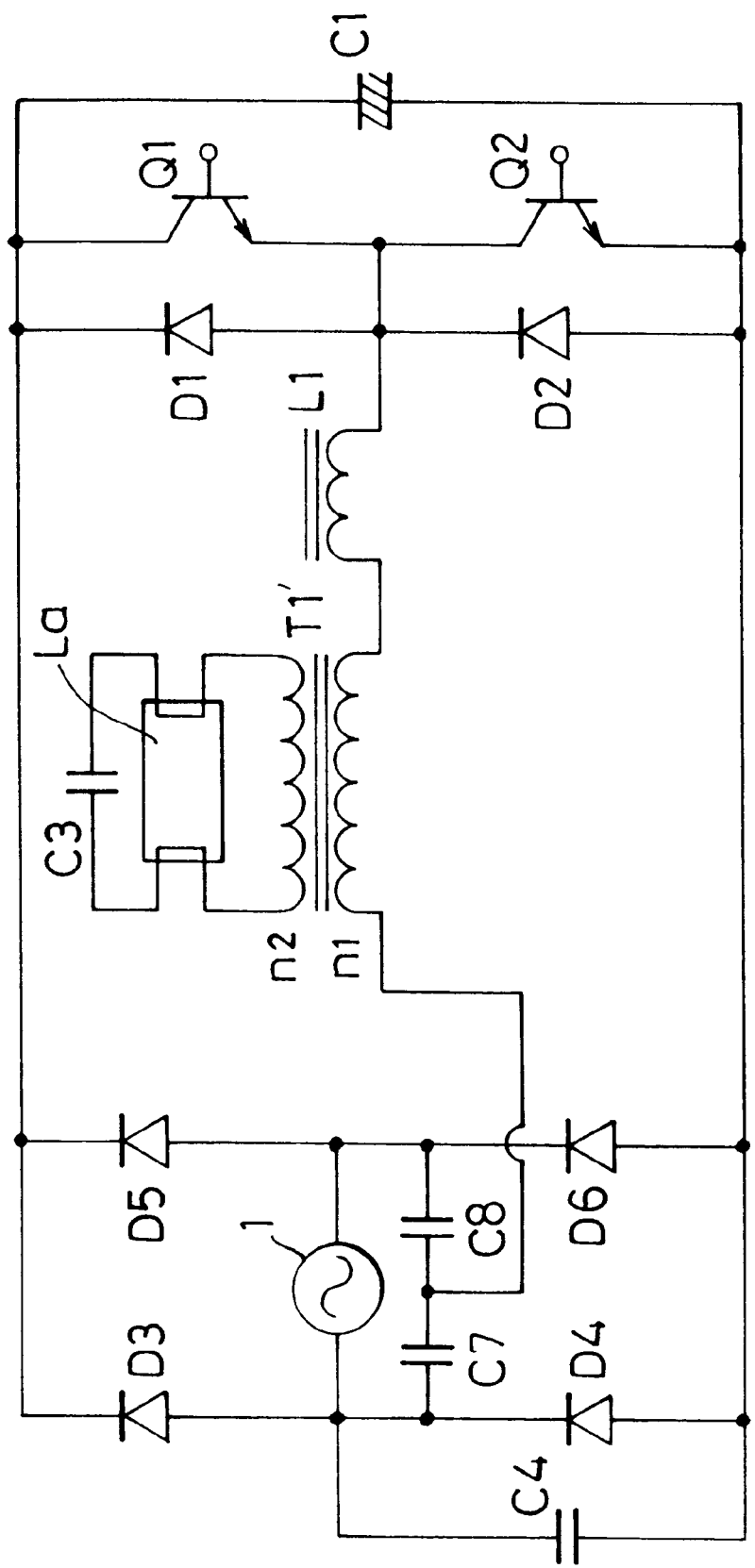

In another embodiment shown in FIG. 37 of the present invention, the voltage from the AC power source 1 is voltage-divided by capacitors C7 and C8, and the primary winding n1 and the AC power source 1 are not connected directly but the primary winding n1 is connected at its one end to a junction of the capacitors C7 and C8. In the present embodiment, further, the transformer T1' is used in place of the leakage transformer T1 in the embodiment of FIG. 29, and the leakage part of the leakage transformer T1 is constituted by the inductor L1 connected in series to the primary winding n1. In the present embodiment, further, the capacitor C2 is omitted, and the capacity of the capacitor C4 is about twice as large as that of the capacitor C4 in the embodiment of FIG. 29.

Since in the present embodiment the arrangement is made for the voltage division of the AC power source 1 by the capacitors C7 and C8 in contrast to the above embodiment, the voltage output to the smoothing capacitor C1 can be effectively reduced. In the present embodiment, further, the reduction in the voltage at the smoothing capacitor C1 causes the constants of the transformer T1', primary winding n1, capacitor C4 and so on to be required to be modified. Other respects in the arrangement, function and effect of the present embodiment are substantially the same as those not only in the embodiment of FIG. 29 but also in the respective foregoing embodiments.

In the present embodiment, too, the high frequency current reduced in the low frequency component by the transformer T1 is supplied to such load as the discharge lamp La. Further, the series circuit of the inductor L1 and the inductance element corstituted by the primary winding n1 will be of the low impedance with respect to the AC power source 1, so that there occurs no shortage of the input power, and the input current distortion will be also small.

Figure 38:
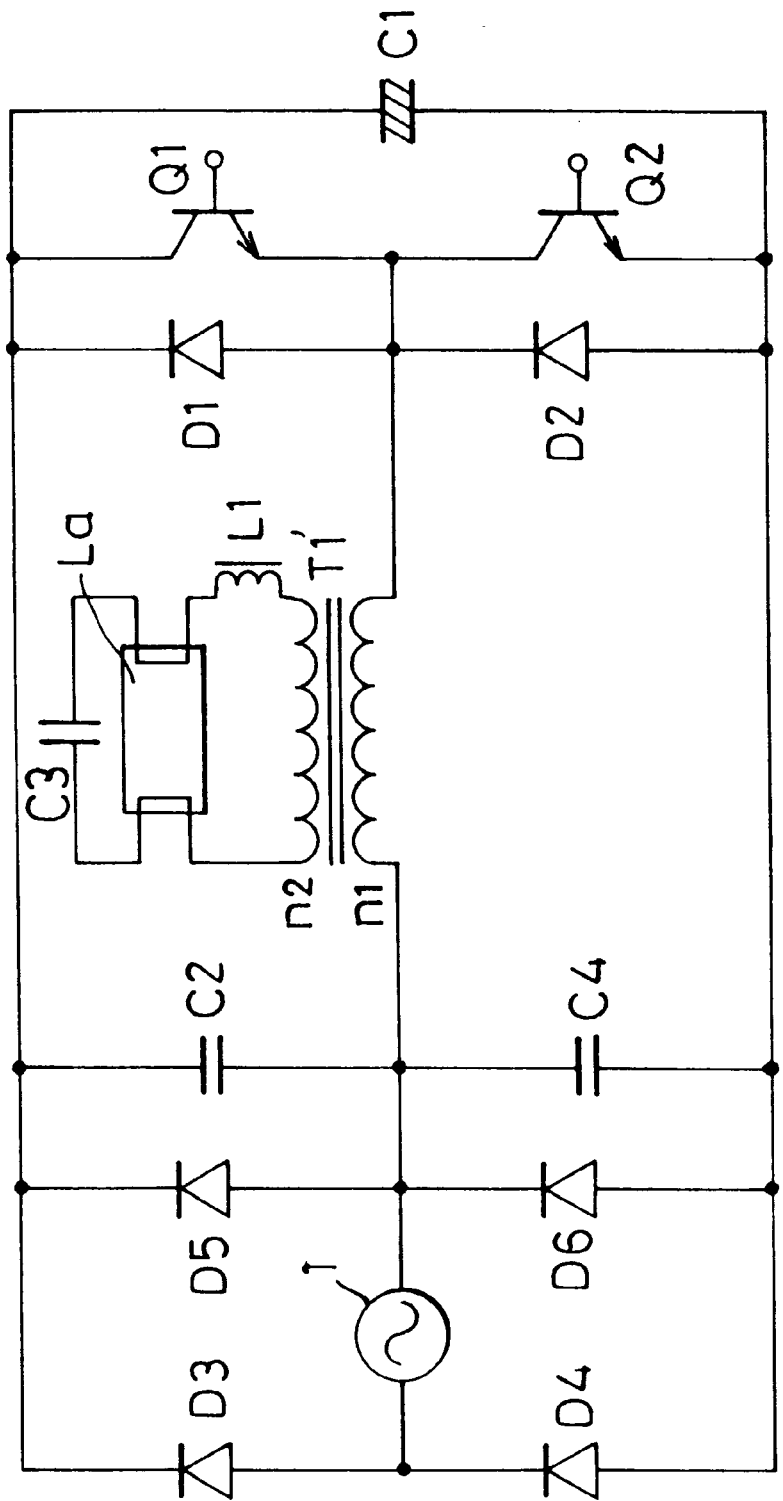

In another embodiment of the present invention as shown in FIG. 38, the inductance L1 in the embodiment of FIG. 36 is connected between the secondary winding n2 of the transformer T1 and the discharge lamp La, instead of being series to the primary winding n1 of the transformer T1. Other respects of the arrangement, function and effect of the present embodiment are substantially the same as those in the embodiment of FIG. 36.

Figure 39:
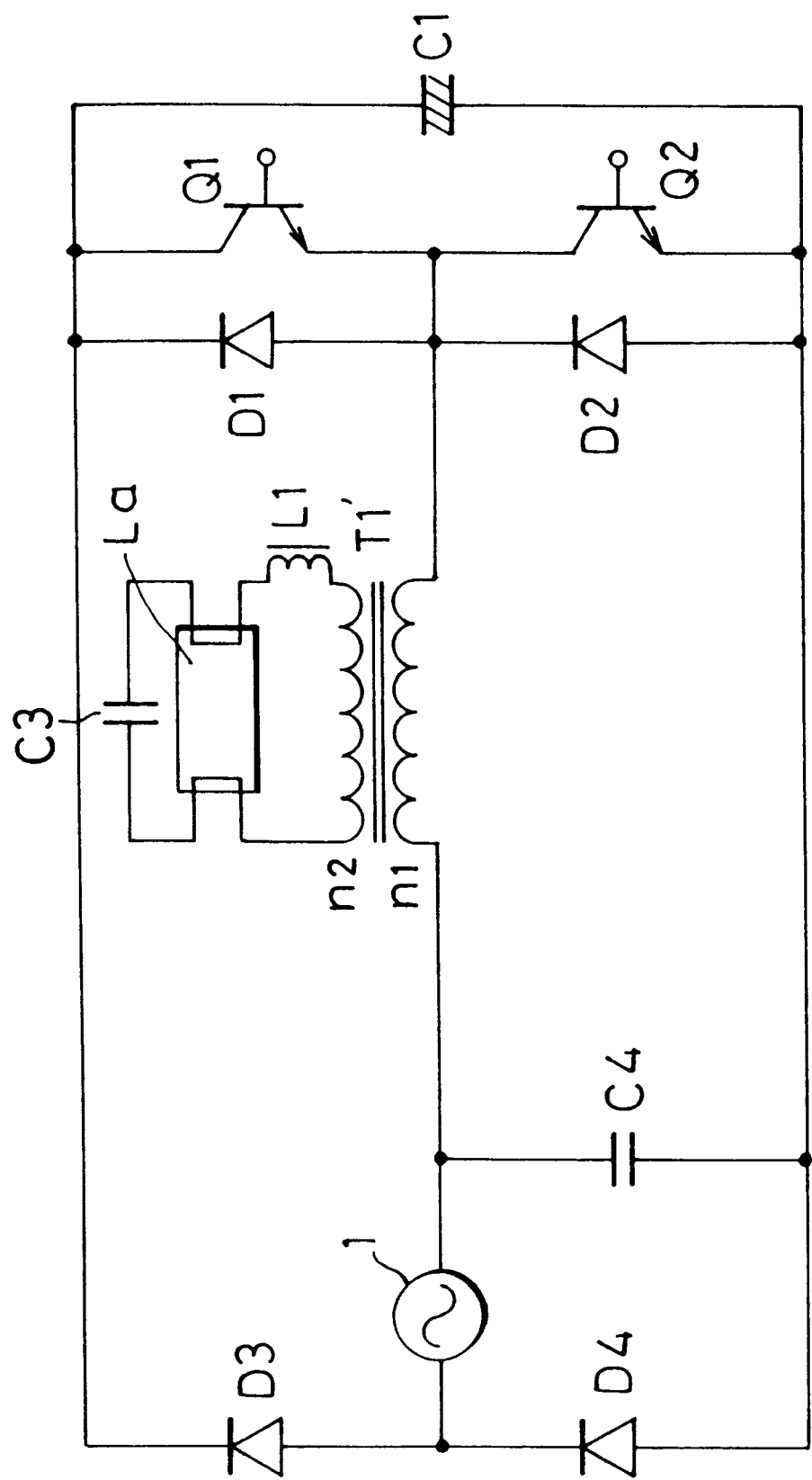

In another embodiment shown in FIG. 39 of the present invention, the inductor L1 in the embodiment of FIG. 33 is connected, instead of being series to the primary winding n1 of the transformer T1, between the secondary winding n2 of the transformer T1 and the discharge lamp La. Other respects of the arrangement, function and effect of this embodiment are substantially the same as those in the embodiment of FIG. 33.

What is claimed is:

1. A power source device comprising a rectifying means for rectifying an AC output of an AC power source, a smoothing first capacitor, a series circuit of a pair of first and second switching elements connected in parallel to the first capacitor and alternately turned ON and OFF at a high frequency, first and second diodes respectively connected in inverse-parallel to the first and second switching elements, a plurality of transformers respectively connected at primary winding of each transformer between a junction point of the first and second switching elements and one of DC output terminals of the rectifying means, a plurality of load circuits respectively connected to secondary winding of each of the transformers, a plurality of second capacitors respectively connected at one end to a junction point of the primary winding of each of the transformers and the DC output terminals of the rectifying means and at the other end to one end of the first capacitor for forming resonance circuits with the primary windings of the respective transformers in accordance with the ON and OFF of the first and second switching elements, and a plurality of third diodes connected between the DC output terminal of the rectifying means and junction points of the respective primary windings of the transformers and the respective capacitors for forming current flowing paths from the AC power source through the transformers.

2. A power source device comprising:
   a smoothing first capacitor,
   a series connection of first and second switching elements connected in parallel to the first capacitor and made alternately ON and OFF at a high frequency, first and second diodes, respectively connected in inverse-parallel to each of the series connected first and second switching elements, and an inductance circuit including an inductance element connected at an end to a junction point of the first and second switching elements, a parallel circuit of a load and a third capacitor and connected in parallel to the inductance element, a second capacitor connected between the other end of the inductance circuit and an end of the first capacitor to form a resonance circuit in conjunction with the inductance element of the inductance circuit, and an AC source-power rectifying means connected at DC output ends between the other end of the inductance circuit and at least one end of the first capacitor.

3. The device according to claim 2 wherein the load is a discharge lamp.

4. The device according to claim 2 which further comprises a control means for variably controlling the ON and OFF frequency of the first and second switching elements.

5. The device according to claim 2 which further comprises a control means for variably controlling ON period of the respective first and second switching elements.

6. The device according to claim 2 which further comprises means for detecting both-end voltage of the first capacitor, and a control means for variably controlling at least one of the ON/OFF frequency and the ON period of the respective first and second switching elements in accordance with the both-end voltage of the first capacitor detected by the voltage detecting means.

7. The device according to claim 2 which further comprises means for detecting a DC output end voltage of the rectifying means, and means for variably controlling at least one of the ON/OFF frequency and the ON period of the respective first and second switching elements, so that, in a period when the DC output end voltage of the rectifying means is high, the ON/OFF frequency is varied to be lowered and the ON period is varied toward enlargement of an output to the load and, in a state where the DC output end voltage of the rectifying means is substantially close to zero, the ON/OFF frequency is elevated and the ON period is varied towards decrement of the output to the load.

8. The device according to claim 2 which further comprises means for detecting a current flowing at least to one of the load and transformer, and means for variably controlling at least one of the ON/OFF frequency and the ON period of the respective first and second switching elements for rendering the current to be substantially constant in accordance with the current detected by the current detecting means.

9. The device according to claim 2 wherein a third capacitor is connected in series to the secondary winding of the transformer and the load.

10. The device according to claim 2 wherein a switching means is provided for disconnection between the output ends of the rectifying means and both ends of the first capacitor.

11. The device according to claim 2, wherein means is provided for rendering the capacity of the second capacitor variable.

12. The device according to claim 2 wherein a plurality of the loads are provided.

13. The device according to claim 2 wherein the inductance element is connected in series with the transformer and load, at least one of outputs of the inductance element driving the first and second switching elements to be ON and OFF.

14. The device according to claim 2 wherein the inductance element comprises a primary winding of a transformer, the load is connected to a secondary winding of the transformer, and an inductor is connected in series to the primary winding of the transformer.

15. The device according to claim 2 wherein the inductance element comprises a primary winding of a transformer, and a series circuit of the load and an inductor is connected to a secondary winding of the transformer.

16. The device according to claim 2 which further comprises a transformer having primary and secondary windings, the inductance element being constituted by the primary winding connected between the junction point of the first and second switching elements and one of the DC output ends of the rectifying means, and the load being connected to the secondary winding.

17. The device according to claim 16 wherein the transformer is a leakage transformer.

18. The device according to claim 2 which further comprises an AC power source forming a series circuit with the inductance element, and wherein the rectifying means comprises a diode bridge for a full-wave rectification having AC input terminals to which the series circuit of the AC power source and inductance element is connected and DC output terminals across which the smoothing first capacitor is connected, the first and second diodes are respectively connected to an end of the rectifying means, the first and second switching elements are provided for alternate turning ON and OFF at a sufficiently higher frequency than a frequency of the AC power source, and the first capacitor is connected between one of the DC output terminals of the rectifying means and an end of the AC power source.

19. The device according to claim 18 wherein at least one of the DC output terminals of the full-wave rectifying means is connected, through a diode, between the AC power source and the inductance element.

20. The device according to claim 18 wherein the transformer comprises a leakage transformer, the inductance element being formed with a primary winding of the leakage transformer, and the load being connected to a secondary winding of the leakage transformer.

21. The device according to claim 18 wherein the inductance element comprises an inductor, and the load is connected in parallel to the inductor.

* * * * *